US008882856B2

(12) United States Patent
Intelmann et al.

(10) Patent No.: US 8,882,856 B2
(45) Date of Patent: Nov. 11, 2014

(54) PROCESS FOR PRODUCING ELECTROLYTIC CAPACITORS WITH A POLYMERIC OUTER LAYER

(75) Inventors: Matthias Intelmann, Köln (DE); Klaus Wussow, Netphen (DE); Udo Merker, Köln (DE)

(73) Assignee: Heraeus Precious Metals GmbH & Co. KG (DE)

( * ) Notice: Subject to any disclaimer, the term of this patent is extended or adjusted under 35 U.S.C. 154(b) by 0 days.

(21) Appl. No.: 13/148,086

(22) PCT Filed: Feb. 4, 2010

(86) PCT No.: PCT/EP2010/000685
§ 371 (c)(1),
(2), (4) Date: Oct. 4, 2011

(87) PCT Pub. No.: WO2010/089111
PCT Pub. Date: Aug. 12, 2010

(65) Prior Publication Data
US 2012/0057275 A1     Mar. 8, 2012

Related U.S. Application Data

(60) Provisional application No. 61/234,000, filed on Aug. 14, 2009.

(30) Foreign Application Priority Data

Feb. 5, 2009    (DE) .................. 10 2009 007 594

(51) Int. Cl.
H01G 9/00       (2006.01)
H01G 9/15       (2006.01)
H01G 9/028      (2006.01)

(52) U.S. Cl.
CPC ............... *H01G 9/028* (2013.01); *Y02E 60/13* (2013.01); *H01G 9/15* (2013.01)
USPC ........................................ 29/25.03

(58) Field of Classification Search
None
See application file for complete search history.

(56) References Cited

U.S. PATENT DOCUMENTS

| 4,910,645 | A  |    | 3/1990  | Jonas et al. |
| 5,473,503 | A  |    | 12/1995 | Sakata et al. |
| 6,376,105 | B1 |    | 4/2002  | Jonas et al. |
| 2004/0074779 | A1 |    | 4/2004  | Sotzing |
| 2005/0111165 | A1 |    | 5/2005  | Merker et al. |
| 2006/0076541 | A1 | *  | 4/2006  | Yoshida et al. ............... 252/500 |
| 2006/0236531 | A1 |    | 10/2006 | Merker et al. |
| 2007/0064376 | A1 |    | 3/2007  | Merker et al. |
| 2007/0171597 | A1 |    | 7/2007  | Merker et al. |
| 2008/0005878 | A1 |    | 1/2008  | Merker et al. |

FOREIGN PATENT DOCUMENTS

| DE | 19627071 A1 | 1/1998 |
| EP | 340512 A2   | 11/1989 |
| EP | 440957 A2   | 8/1991 |

(Continued)

*Primary Examiner* — Seahvosh Nikmanesh
(74) *Attorney, Agent, or Firm* — Drinker Biddle & Reath LLP

(57) ABSTRACT

The invention relates to a process for producing electrolytic capacitors with low equivalent series resistance, low residual current and high thermal stability, which consist of a solid electrolyte and an outer layer comprising conjugated polymers, to electrolytic capacitors produced by this process and to the use of such electrolytic capacitors.

27 Claims, 4 Drawing Sheets

(56) References Cited

FOREIGN PATENT DOCUMENTS

| | | | |
|---|---|---|---|
| EP | 0637043 | A1 | 2/1995 |
| EP | 1524678 | A2 | 4/2005 |
| EP | 1713103 | A1 | 10/2006 |
| EP | 1746613 | A1 | 1/2007 |
| JP | H-0794368 | | 4/1995 |
| JP | H1167602 | A | 3/1999 |
| JP | 2003188052 | A | 7/2003 |
| JP | 2005203662 | A | 7/2005 |
| JP | 2006-295184 | A | 10/2006 |
| WO | WO-01/16972 | A1 | 3/2001 |
| WO | WO-2007/031206 | A1 | 3/2007 |

* cited by examiner

US 8,882,856 B2

PROCESS FOR PRODUCING ELECTROLYTIC CAPACITORS WITH A POLYMERIC OUTER LAYER

CROSS-REFERENCE TO RELATED APPLICATIONS

This application is a national stage application (under 35 U.S.C. §371) of PCT/EP2010/000685, filed Feb. 4, 2010, which claims benefit of German Application 10 2009 007 594.1, filed Feb. 5, 2009, and claims benefit of U.S. Provisional Application 61/234,000, filed Aug. 14, 2009.

BACKGROUND OF THE INVENTION

The invention relates to a process for producing electrolytic capacitors with low equivalent series resistance, low residual current and high thermal stability, which consist of a solid electrolyte and an outer layer comprising conjugated polymers, to electrolytic capacitors produced by this process and to the use of such electrolytic capacitors.

A conventional solid electrolytic capacitor consists generally of a porous metal electrode, an oxide layer present on the metal surface, an electrically conductive solid which is introduced into the porous structure, an outer electrode (contact connection), for example a silver layer, and further electrical contacts and an encapsulation.

Examples of solid electrolytic capacitors are tantalum, aluminum, niobium and niobium oxide capacitors with charge transfer complexes, or manganese dioxide or polymer solid electrolytes. The use of porous bodies has the advantage that, owing to the high surface area, it is possible to achieve a very high capacitance density, i.e. a high electrical capacitance in a small space.

Owing to their high electrical conductivity, particularly suitable solid electrolytes are conjugated polymers. Conjugated polymers are also referred to as conductive polymers or as synthetic metals. They are gaining increasing economic significance since polymers have advantages over metals with regard to processibility, to weight and to the controlled adjustment of properties by chemical modification. Examples of known conjugated polymers are polypyrroles, polythiophenes, polyanilines, polyacetylenes, polyphenylenes and poly(p-phenylenevinylenes), a particularly important and industrially utilized polythiophene being poly-3,4-(ethylene-1,2-dioxy)thiophene, often also referred to as poly(3,4-ethylenedioxythiophene), since it possesses, in its oxidized form, a very high conductivity and a high thermal stability.

Practical development in electronics is increasingly requiring solid electrolytic capacitors with very low equivalent series resistances (ESR). The reasons for this are, for example, falling logic voltages, a higher integration density and rising clock frequencies in integrated circuits. Moreover, a low ESR also lowers the power consumption, which is advantageous particularly for mobile, battery-operated applications. It is therefore desirable to reduce the ESR of solid electrolytic capacitors as far as possible.

European Patent EP-B-340 512 describes the production of a solid electrolyte from 3,4-ethylene-1,2-dioxythiophene and the use of the cationic polymer thereof, prepared by oxidative polymerization, as a solid electrolyte in electrolytic capacitors. Poly(3,4-ethylenedioxythiophene) as a replacement for manganese dioxide or for charge transfer complexes in solid electrolytic capacitors lowers the equivalent series resistance of the capacitor and improves the frequency behavior owing to the higher electrical conductivity.

In addition to a low ESR, modern solid electrolytic capacitors require a low residual current and a good stability with respect to external mechanical and thermal stresses. Especially during the production process, the encapsulation of the capacitor anodes involves high mechanical stresses which can greatly increase the residual current of the capacitor anode. When the capacitors are soldered on, high soldering temperatures of approx. 260° C. are used, which require a good thermal stability of the polymeric outer layer. The operation of the capacitors in an environment with elevated working temperature, for example in the automotive sector, also requires a high thermal stability of the polymeric outer layer.

Stability with respect to such stresses, and hence a low residual current, can be achieved in particular by an outer layer composed of conductive polymers with a thickness of approx. 5-50 μm on the capacitor anode.

Such a layer serves as a mechanical buffer between the capacitor anode and the cathode-side contact connection. This prevents, for example, the silver layer (contact connection) from coming into direct contact with the dielectric or damaging it in the event of mechanical stress, thus increasing the residual current of the capacitor. The conductive polymeric outer layer itself should have so-called self-healing behavior: minor defects in the dielectric on the outer anode surface, which occur in spite of the buffer effect, are electrically insulated by virtue of the conductivity of the outer layer being destroyed by the electrical current at the defect site. The conductive polymeric outer layer must cover especially the edges and corners of the capacitor body, since the highest mechanical stresses occur thereon.

The formation of a thick polymeric outer layer by means of an in situ polymerization is very difficult. The layer formation requires very many coating cycles. As a result of the large number of coating cycles, the outer layer becomes very inhomogeneous; especially the edges of the capacitor anode are often covered insufficiently. Japanese Patent Application JP-A 2003-188052 states that homogeneous edge coverage requires a complicated balance of the process parameters. However, this makes the production process very prone to faults. In addition, the layer polymerized in situ generally has to be freed of residual salts by washing, which causes holes in the polymer layer.

An impervious electrically conductive outer layer with good edge coverage can be achieved by electrochemical polymerization. However, electrochemical polymerization requires that a conductive film is first deposited on the insulating oxide layer of the capacitor anode and this layer is then electrically contacted for each individual capacitor. This contact connection is very costly and inconvenient in mass production and can damage the oxide layer.

In European Patent Application EP-A-1524678, a polymeric outer layer is obtained by applying a dispersion comprising particles of a conductive polymer and a binder. With these processes, it is possible to obtain polymeric outer layers relatively easily. However, the edge coverage in this process is not always reliable and reproducible. In addition, the thermal stability of the polymeric outer layer under prolonged stress at elevated temperature is insufficient.

European Patent Application EP-A-1746613 improves the process from EP-A-1524678 by-virtue of solid particles having a diameter in the range from 0.7 to 20 μm being added to the dispersion. This significantly improves the edge and corner coverage. However, the addition of solid particles makes the polymeric outer film brittle, which can cause the outer layer to flake off locally and hence an increase in the residual current and in the ESR.

There was thus a need to improve the process for producing solid electrolytic capacitors described in EP-A-1524678 to the effect that better edge and corner coverage can be achieved without making the outer layer brittle.

SUMMARY OF THE INVENTION

It was therefore an object of the present invention to provide such a process and the capacitors thus improved.

It has now been found that, surprisingly, these requirements can be met by applying a crosslinker to the capacitor body and then applying a solution or dispersion of a conjugated polymer when the crosslinker comprises at least one diamine, triamine, oligoamine or polymeric amine or derivatives thereof, at least one cation and additionally at least one amine group, or at least one polyvalent cation, or which, after the solution or the dispersion of a conjugated polymer has been applied, forms at least one polyvalent cation.

The application of the inventive crosslinker before the application of the solution or dispersion leads to a significantly improved corner and edge coverage by the conjugated polymer. Additives in the solution or dispersion, such as coarse solid particles, are no longer required. In the case of simultaneous application of crosslinker and solution or dispersion, for example by addition of the crosslinker to the solution or dispersion, the requirements, in contrast, cannot be met.

The present invention therefore provides a process for producing an electrolytic capacitor, in which at least one crosslinker e) is applied to a capacitor body at least comprising an electrode body of an electrode material and a dielectric which covers the surface of this electrode material, and a solid electrolyte at least comprising an electrically conductive material which completely or partially covers the dielectric surface, and, after applying the crosslinker e), at least one solution or a dispersion a) of a conjugated polymer b) is applied, and a polymeric outer layer is formed by at least partly removing the solvent or dispersant d), characterized in that the crosslinker E) comprises at least one diamine, triamine, oligoamine or polymeric amine or derivatives thereof, at least one cation and additionally at least one amine group, or at least one polyvalent cation, or the crosslinker e), after applying the solution or dispersion a), forms at least one polyvalent cation.

A BRIEF DESCRIPTION OF THE FIGURES

FIG. 1 describes a schematic diagram of the construction of a solid electrolytic capacitor.

FIG. 2 describes the enlarged detail 10 from FIG. 1 of the schematic layer structure of the tantalum capacitor.

A DETAILED DESCRIPTION OF THE INVENTION

Figure 1:
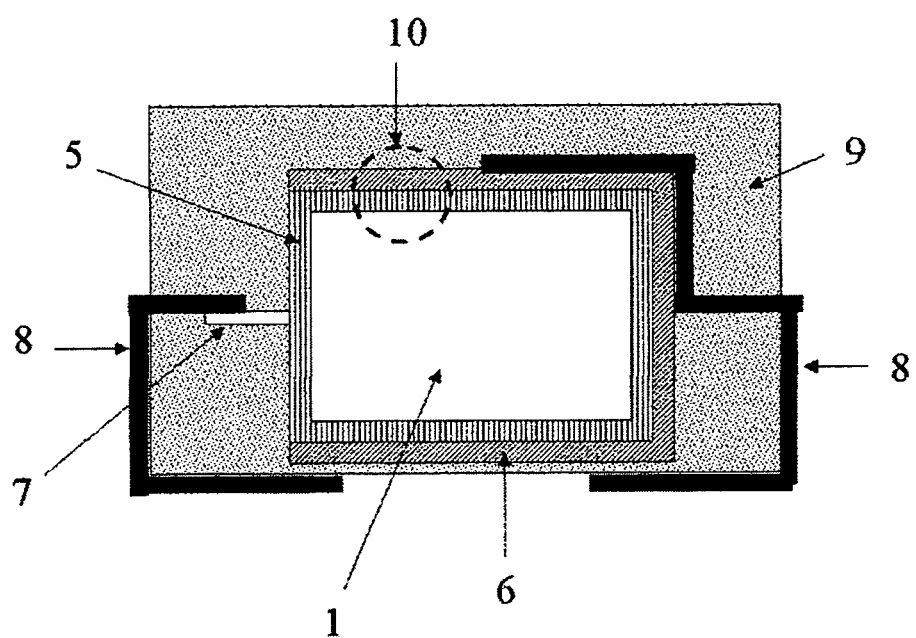

The enumerations given below serve to illustrate the invention by way of example and should not be considered to be exclusive.

In the electrolytic capacitor produced by the process according to the invention, the electrode material preferably forms a porous body with high surface area, and is present, for example, in the form of a porous sintered body or of a roughened film. This body is also referred to hereinafter as electrode body for short.

The electrode body covered with a dielectric is also referred to hereinafter as oxidized electrode body for short. The term "oxidized electrode body" also includes those electrode bodies covered with a dielectric which has not been produced by oxidation of the electrode body.

The electrode body covered with a dielectric and completely or partially with a solid electrolye is also referred to hereinafter as capacitor body for short.

The outer surface of the capacitor body is understood to mean the outer faces of the capacitor body.

The electrically conductive layer which is produced from the solution or dispersion a) by the process according to the invention is referred to here as polymeric outer layer.

The solution or dispersion a) preferably comprises at least one polymer with a mean molecular weight (weight average) greater than 1000, more preferably greater than 3000, even more preferably greater than 10 000, exceptionally preferably greater than 20 000 and in a particularly preferred embodiment greater than 50 000, in order that better crosslinking by the crosslinker e) can take place.

The polymer with a mean molecular weight greater than 1000 preferably comprises at least the conjugated polymer b) of the solution or dispersion a), a polymeric anion or a polymeric binder.

Particular preference is given to a polymeric anion as the polymer with a mean molecular weight greater than 1000.

The mean molecular weight (weight average) is determined, for example, by means of gel permeation chromatography (GPC) using a suitable eluent and an MCX column combination. The detection is effected here by means of an RI detector. The signals are evaluated with reference to a polystyrenesulfonic acid calibration at 25° C.

Useful crosslinkers e) in the process according to the invention are preferably those which comprise at least a diamine, triamine, oligoamine or polymeric amine or derivatives thereof, a polyvalent metal cation, for example salts or compounds of Mg, Al, Ca, Fe, Cr, Mn, Ba, Ti, Co, Ni, Cu, Ru, Ce or Zn, for example $MgBr_2$, $MgCl_2$, $MgSO_4$, $ZnBr_2$, $ZnCl_2$, $ZnSO_4$, $AlCl_3$, $Al_2(SO_4)_3$, $CuCl_2$, $CuSO_4$, $TiOSO_4$, $FeCl_2$, $FeCl_3$, $FeSO_4$, $Fe_2(SO_4)_3$.

A compound with at least two phosphonium groups, for example triphenylphosphonium compounds, for example (2-dimethylaminoethyl)triphenylphosphonium bromide or p-xylylenebis(triphenylphosphonium bromide), a compound with a phosphonium group and at least one amine group, for example (2-dimethyl-aminoethyl) triphenylphosphonium bromide or derivatives thereof, a compound with at least two sulfonium groups, for example triarylsulfonium salts, as, for example, in formula (XX)

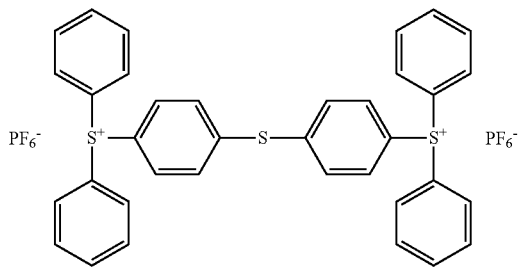

(XX)

or metals which can form polyvalent cations, for example Mg, Al, Ca, Fe, Cr, Mn, Ba, Ti, Co, Ni, Cu, Sn, Ce or Zn, or alloys comprising these metals.

Particular preference is given to crosslinkers e) which comprise at least one diamine, triamine, oligoamine or polymeric amine or derivatives thereof, or a polyvalent metal cation.

Very particular preference is given to crosslinkers e) which comprise at least one diamine, triamine, oligoamine or polymeric amine or derivatives thereof.

Exceptional preference is given to crosslinkers e) which comprise at least one diamine, triamine or tetramine or derivatives thereof.

Oligoamines are understood to mean those amines which contain at least four or more amine groups, for example a tetramer, pentamer, hexamer, heptamer, octamer, nonamer, decamer, undecamer or dodecamer.

Examples of crosslinkers e) which comprise at least one diamine, triamine, oligoamine or polymeric amine or derivatives thereof include the following amines:

aliphatic amines, for example
- aliphatic α,ω-diamines, for example 1,4-diaminocyclohexane or 1,4-bis(amino-methyl)cyclohexane,
- linear aliphatic α,ω-diamines, for example ethylenediamine, 1,6-hexanediamine, 1,7-heptanediamine, 1,8-octanediamine, 1,9-nonanediamine, 1,10-decanediamine or 1,12-dodecanediamine,
- derivatives of the aliphatic α,ω-diamines, for example N,N-dimethylethylenediamine, N,N,N',N'-tetramethylethylenediamine, N,N,N',N'-tetramethyl-1,4-butanediamine, N,N,N,N',N',N'-hexamethylhexamethylene-diammonium dibromide, piperazine, 1,4-diazabicyclo[2.2.2]octane, N,N,N',N'-tetrakis(2-hydroxypropyl)ethylenediamine, N-[3-(trimethoxysilyl)propyl]ethylenediamine, or 1,4-bis(3-aminopropyl)piperazine,
- amides, for example N,N'-diacetyl-1,6-hexanediamine, N,N,N',N'-tetraacetylethylene-diamine, 1,4-diformylpiperazines or N,N'-ethylenebis(stearamide);

aliphatic amines having at least three amino groups, for example 1,4-bis(3-aminopropyl)piperazine, linear aliphatic amines having at least three amino groups, for example N-(6-aminohexyl)-1,6-diaminohexane or N-(3-aminopropyl)-1,4-diaminobutane, derivatives of linear aliphatic amines having at least three amino groups, for example 3-[2-(2-aminoethylamino)ethylamino]propyltrimethoxysilane, aromatic amines having at least two amino groups, for example brilliant green (formula XXI), 4,4'-methylenebis(N,N-diglycidylaniline), o-phenylene-diamine, m-phenylenediamine, p-phenylenediamine, 1,5-diaminonaphthalene, 1,8-diaminonaphthalene, 2,3-diaminonaphthalene, 3-aminophenyl sulfone, 4-aminophenyl sulfone, 4-aminophenyl ether, 3,3'-diaminobenzidine, 2-(4-aminophenyl)ethylamine, 4,4'-methylenedianiline, 2,6-diaminotoluene, N,N,N',N'-tetramethyl-p-phenylenediamine, 4,4'-bis(diethylamino)benzophenone, 4,4'-bis(dimethyl-amino)benzhydrol, 3,3',5,5'-tetramethylbenzidine, Auramine O, Rubine S, m-xylenediamine, phthalein, complexone, Brilliant Blue G, folic acid

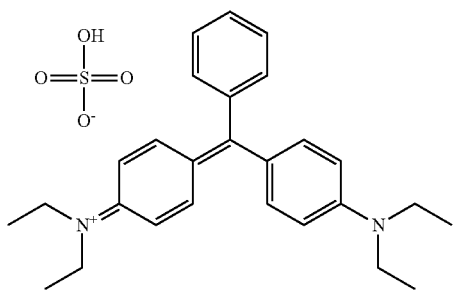

(XXI)

aromatic triamines, for example 4,4',4''-methylidinetris(N,N-dimethylaniline) (formula XXII)

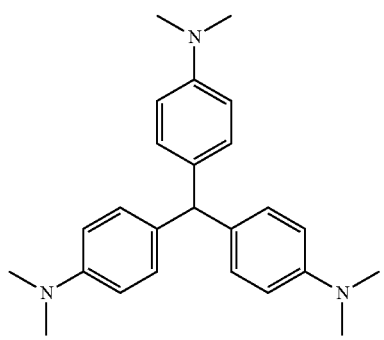

(XXII)

amino acids having at least two amino groups, for example citrulline, arginine, glutamine, lysine, asparagine, histidine or tryptophan, polymeric amines, for example poly(propylene glycol) bis(2-aminopropyl) ether, polyethyleneimine and poly(allylamine) and derivatives of polymeric amines, for example ethoxylated polyethyleneimine;

further examples are given in the formulae XXIII to XXVI.

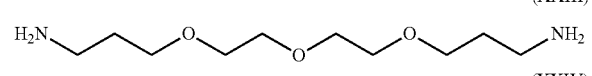

(XXIII)

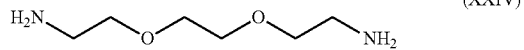

(XXIV)

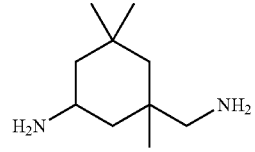

(XXV)

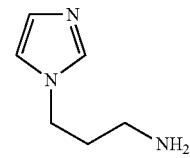

(XXVI)

It is also possible to use mixtures of the crosslinkers listed above.

Preference is given to the aliphatic amines, particular preference to the aliphatic α,ω-diamines, very particular preference to the linear aliphatic α,ω-diamines. Exceptionally preferred are diaminooctane, diaminononane, diaminodecane, diaminoundecane and derivatives thereof, and mixtures of diaminooctane, diaminononane, diaminodecane, diaminoundecane and derivatives thereof.

In the process according to the invention, the crosslinker e), after application of the solution or of the dispersion a), may form a polyvalent cation, for example by reaction with the solution or dispersion a), by reaction with the solvent or dispersant d) or by reaction with further additives in the solution or dispersion a).

For example, crosslinkers e) which comprise the metals listed above can form polyvalent metal cations on contact with a solution or dispersion a) whose pH is less than 7. For example, a crosslinker e) which comprises at least one of the metals listed above, for example Ca, can be applied to the capacitor body by a known process, for example vapor deposition, sputtering or sublimation. When this is contacted with a solution or dispersion a) whose pH is less than 7, the corresponding metal cations ($Ca^{2+}$) are formed. These metal cations ($Ca^{2+}$) lead to a significantly improved corner and edge coverage of the capacitor body by the conjugated polymer.

Basic crosslinkers e) can destroy the solid electrolyte, in particular those comprising conductive polymers. The crosslinker e) is therefore preferably applied from a solution or dispersion whose pH is less than 10, more preferably less than 8, even more preferably less than 7 and exceptionally preferably less than 6, the pH being measured at 25° C. The pH is measured by means of a pH paper which is moistened beforehand with demineralized water in the case of nonaqueous solutions or dispersions. The solution or dispersion preferably has a pH greater than 1, more preferably greater than 2, most preferably greater than 3. For the amines listed above, the pH can be adjusted, for example, by adding an acid. The acids used may be inorganic acids, for example sulfuric acid, phosphoric acid or nitric acid, or organic acids, for example carboxylic or sulfonic acids. Preference is given to carboxylic or sulfonic acids such as $C_1$-$C_{20}$-alkanesulfonic acids such as methanesulfonic acid, ethanesulfonic acid, propanesulfonic acid, butanesulfonic acid, or higher sulfonic acids such as dodecanesulfonic acid, of aliphatic perfluorosulfonic acids such as trifluoromethanesulfonic acid, perfluorobutanesulfonic acid or perfluorooctanesulfonic acid, of aliphatic $C_1$-$C_{20}$-carboxylic acids such as 2-ethylhexylcarboxylic acid, of aliphatic perfluorocarboxylic acids such as trifluoroacetic acid or perfluorooctanoic acid, and of aromatic sulfonic acids optionally substituted by $C_1$-$C_{20}$-alkyl groups, such as benzenesulfonic acid, o-toluenesulfonic acid, p-toluenesulfonic acid or dodecylbenzenesulfonic acid, and of cycloalkanesulfonic acids such as camphorsulfonic acid.

In addition to monobasic or monofunctional acids, also referred to hereinafter as monoacids, for example monosulfonic acids or monocarboxylic acids, it is also possible to use diacids, triacids, etc. to adjust the pH, for example the di- and trisulfonic acids or the di- and tricarboxylic acids.

It is also possible to use polymeric carboxylic acids such as polyacrylic acids, polymethacrylic acid or polymaleic acids, or polymeric sulfonic acids such as polystyrenesulfonic acids and polyvinylsulfonic acids, to adjust the pH. These polycarboxylic and polysulfonic acids may also be copolymers of vinylcarboxylic and vinylsulfonic acids with other polymerizable monomers, such as acrylic esters and styrene.

The crosslinker e) is preferably applied to the capacitor body in such a way that the crosslinker e), after being applied to the capacitor body, is present in the form of a salt or of a salt solution. The salt of the crosslinker e) can be obtained by treating the crosslinker e) with a suitable material m) which is capable of forming a salt with the crosslinker e). Suitable materials m) are, for example, the above-listed acids which can be used for pH adjustment. The acids can form salts of the crosslinker e) with basic crosslinkers e). The suitable material m) for treating the crosslinker e) may be solid, liquid or gaseous. The suitable material m) may also be present in the form of a solution or dispersion. In the case of treatment of the crosslinker e) with a solution or dispersion of a suitable material m), a solution or dispersion whose pH is preferably less than 10, more preferably less than 8, even more preferably less than 7 and exceptionally preferably less than 6 is used, the pH being measured at 25° C. In this case, in a sequential process, the crosslinker e) can first be applied to the capacitor body and then the treatment with the solution or dispersion of the suitable material m) can be effected, or the capacitor body can be treated with the solution or dispersion of the suitable material m) and then the crosslinker e) can be applied to the capacitor body. Preference is given to a process in which the crosslinker e) is already present in a solution or dispersion whose pH is preferably less than 10, more preferably less than 8, even more preferably less than 7 and exceptionally preferably less than 6, from which the salt of the crosslinker e) is applied to the capacitor body.

Examples of solvents or dispersants for the crosslinker e) include the following organic solvents: linear or branched $C_1$- to $C_8$-alcohols such as methanol, ethanol, isopropanol, n-propanol, n-butanol, isobutanol and tert-butanol; cyclic $C_3$- to $C_8$-alcohols such as cyclohexanol; aliphatic ketones such as acetone and methyl ethyl ketone; aliphatic carboxylic esters such as ethyl acetate and butyl acetate; aromatic hydrocarbons such as toluene and xylene; aliphatic hydrocarbons such as hexane, heptane and cyclohexane; chlorohydrocarbons such as dichloromethane and dichloroethane; aliphatic nitriles such as acetonitrile, aliphatic sulfoxides and sulfones such as dimethyl sulfoxide and sulfolane; aliphatic carboxamides such as methylacetamide, dimethylacetamide and dimethylformamide; aliphatic and araliphatic ethers such as diethyl ether and anisole. It is also possible to use mixtures of the aforementioned organic solvents as the solvent. In addition, it is also possible to use water or a mixture of water with the aforementioned organic solvents as the solvent.

Preferred solvents or dispersants are water or other protic solvents such as linear or branched $C_1$- to $C_6$-alcohols such as methanol, ethanol, isopropanol, n-propanol, n-butanol, isobutanol and tert-butanol; cyclic $C_3$- to $C_8$-alcohols such as cyclohexanol. Particular preference is given to mixtures of water with these alcohols or with mixtures of these alcohols, very particular preference to mixtures of water with methanol, ethanol, isopropanol or n-propanol.

If appropriate, the crosslinker e) may also function as the solvent.

The concentration of the crosslinker e) in the solvent or dispersant is preferably 0.0001 molar to 10 molar, more preferably 0.001 molar to 3 molar, even more preferably 0.01 molar to 1 molar, exceptionally preferably 0.03 molar to 0.6 molar and very exceptionally preferably 0.05 molar to 0.3 molar.

The salt of the crosslinker e) is preferably soluble in the solution or dispersion a) at least in small amounts of at least $10^{-6}$ molar, preferably at least $10^{-5}$ molar, more preferably at least $10^{-4}$ molar and most preferably at least $10^{-3}$ molar.

The crosslinker e) is applied to the capacitor body by known processes, for example by spin-coating, impregnation, casting, dropwise application, spray application, vapor deposition, sputtering, sublimation, knife-coating, painting or printing, for example inkjet, screen or pad printing. The crosslinker e) is applied at least to the corners and/or edges of the capacitor body. In a simple manner, it is applied at least to the entire outer surface or part of the outer surface of the capacitor body. The crosslinker may additionally also be introduced into the porous capacitor body. After the application, solvent or dispersant present in the crosslinker e) is preferably removed at least partly, for example by a thermal treatment. For the removal of the solvent or dispersant, preference is given to drying temperatures between 15° C. and 500° C., more preferably between 25° C. and up to 300° C. and most preferably between 50° C. and up to 150° C.

After applying the crosslinker e) to the capacitor body and optionally removing the solvent or dispersant, at least one solution or a dispersion a) of a conjugated polymer b) is applied to the capacitor body. After applying the crosslinker e) and optionally after removing the solvent or dispersant, the solution or dispersion a) can also be applied repeatedly. Preference is given to applying the crosslinker e), optionally removing the solvent or dispersant and then applying the solution or dispersion a) repeatedly in order to achieve thicker and/or denser outer layers. Before applying the crosslinker e), it is also already possible to apply layers of the solution or dispersion a).

The parts of the solution or the dispersion a) which were in contact with the capacitor body after application of the crosslinker e) but do not remain thereon and are reused are preferably in contact with one or more ion exchangers continuously or in phases. When, for example, the capacitor body, after application of the crosslinker e), is immersed into a bath comprising the solution or the dispersion a), it may be advantageous to remove contamination in the solution or the dispersion a) by cations which originate from the crosslinker, in order to prevent crosslinking reactions in the bath. To this end, the solution or dispersion a) from the bath is preferably contacted with one or more cation exchangers continuously or in phases. The solution or dispersion a) may additionally also be contacted with one or more anion exchangers in order also to remove any anions present in the crosslinker in addition to the cations. The solution or dispersion a) from the bath is preferably pumped through a cartridge comprising the ion exchanger(s) continuously or in phases. Useful cation and anion exchangers include, for example, the Lewatit® ion exchangers from Lanxess AG, Leverkusen, for example the Lewatit MP 62 anion exchanger and the Lewatit S100 cation exchanger.

The conjugated polymer b) of the solution or dispersion a) preferably has a specific electrical conductivity of greater than 10 S/cm, more preferably greater than 20 S/cm, even more preferably greater than 50 S/cm, exceptionally preferably greater than 100 S/cm and in a particularly preferred embodiment greater than 200 S/cm.

The conjugated polymer b) is preferably present in particles which are present in a dispersion.

The particles comprising the conjugated polymer b) in the dispersion have, in the processes according to the invention, preferably a mean diameter of 1-10 000 nm, more preferably of 1-1000 nm, most preferably of 5-500 nm.

The diameter of the particles comprising the conjugated polymer b) is determined by means of an ultracentrifuge measurement. The general method is described in Colloid Polym. Sci. 267, 1113-1116 (1989). In the case of particles which swell in the dispersion, the particle size is determined in the swollen state. A diameter distribution of the particles is based on a mass distribution of the particles in the dispersion as a function of the particle diameter.

The solutions or dispersions a) preferably contain only small amounts, if any, of metals and transition metals. Metals are understood here to refer to metals or metal ions of main or transition group metals of the Periodic Table of the Elements. As is well known, transition metals in particular can damage the dielectric, such that the elevated residual currents resulting therefrom significantly reduce the lifetime of the capacitors or even make use of the capacitors impossible under harsh conditions, such as high temperatures and/or high air humidity.

In the process, the solution or dispersion a) preferably has a content of metals less than 5000 mg/kg, more preferably less than 1000 mg/kg, most preferably less than 200 mg/kg. Examples of metals here include Na, K, Mg, Al, Ca, Fe, Cr, Mn, Co, Ni, Cu, Ru, Ce or Zn.

In the process, the solution or dispersion a) preferably has a content of transition metals less than 1000 mg/kg, more preferably less than 100 mg/kg, most preferably less than 20 mg/kg. Examples of transition metals here include Fe, Cu, Cr, Mn, Ni, Ru, Ce, Zn or Co.

In the process, the solution or dispersion a) preferably has an iron content less than 1000 mg/kg, more preferably less than 100 mg/kg, most preferably less than 20 mg/kg.

The low concentrations of metals in the solutions or dispersions have the great advantage that the dielectric is not damaged when the polymeric outer layer is formed and in the later operation of the capacitor.

The solution or dispersion a) preferably comprises at least one polymeric organic binder c). Useful particularly preferred polymeric organic binders c) include, for example, polyvinyl alcohols, polyvinylpyrrolidones, polyvinyl chlorides, polyvinyl acetates, polyvinyl butyrates, polyacrylic esters, polyacrylamides, polymethacrylic esters, polymethacrylamides, polyacrylonitriles, styrene/acrylic ester, vinyl acetate/acrylic ester and ethylene/vinyl acetate copolymers, polybutadienes, polyisoprenes, polystyrenes, polyethers, polyesters, polycarbonates, polyurethanes, polyamides, polyimides, polysulfones, melamine-formaldehyde resins, epoxy resins, silicone resins or celluloses. Further useful polymeric organic binders c) are preferably also those which are obtained by adding crosslinkers, for example melamine compounds, capped isocyanates or functional silanes, for example 3-glycidoxypropyltrialkoxysilane, tetraethoxysilane and tetraethoxysilane hydrolyzate, or crosslinkable polymers, for example polyurethanes, polyacrylates or polyolefins, and subsequently crosslinking. Such crosslinking products suitable as polymeric binders c) may also additionally be formed, for example, by reaction of the crosslinkers added with any polymeric anions present in the solution or dispersion a). Preference is given to those binders c) which have a sufficient thermal stability to withstand the thermal stresses to which the finished capacitors are exposed later, for example soldering temperatures of 220 to 260° C.

The solids content of the polymeric binder c) in the solution or dispersion a) is 0.1-90 percent by weight (% by weight), preferably 0.3-30% by weight and most preferably 0.5-10% by weight.

The solutions or dispersions a) may comprise one or more solvents or dispersants d). Examples of solvents or dispersants d) include, for example, the following solvents: aliphatic alcohols such as methanol, ethanol, isopropanol and butanol; aliphatic ketones such as acetone and methyl ethyl ketone; aliphatic carboxylic esters such as ethyl acetate and butyl acetate; aromatic hydrocarbons such as toluene and xylene; aliphatic hydrocarbons such as hexane, heptane and cyclohexane; chlorohydrocarbons such as dichloromethane and dichloroethane; aliphatic nitriles such as acetonitrile, aliphatic sulfoxides and sulfones such as dimethyl sulfoxide and sulfolane; aliphatic carboxamides such as methylacetamide, dimethylacetamide and dimethylformamide; aliphatic and araliphatic ethers such as diethyl ether and anisole. It is also possible to use mixtures of the aforementioned organic solvents as the solvent. In addition, it is also possible to use water or a mixture of water with the aforementioned organic solvents as the solvent or dispersant d).

Preferred solvents or dispersants d) are water or other protic solvents such as alcohols, e.g. methanol, ethanol, i-propanol and butanol, and mixtures of water with these alcohols; the particularly preferred solvent is water.

If appropriate, the binder c) can also function as the solvent or dispersant d).

In the context of the invention, the term "polymers" includes all compounds having more than one identical or different repeat unit.

Conjugated polymers are those polymers which contain at least one sequence of alternating double and single bonds or an uninterrupted sequence of aromatic or heteroaromatic rings.

Conductive polymers are understood here to mean especially the compound class of the conjugated polymers which, after oxidation or reduction, possess electrical conductivity. Preferably, such conjugated polymers are considered to be conductive polymers which, after oxidation, possess an electrical conductivity in the order of magnitude of at least 1 $\mu S$ $cm^{-1}$.

The conjugated polymer b) in the solution or dispersion a) preferably contains at least one polythiophene, polypyrrole or polyaniline, which are optionally substituted.

More preferably, the conjugated polymer b) comprises at least one polythiophene with repeat units of the general formula (I) or of the general formula (II) or of the general formula (X), or repeat units of the formulae (I) and (II), or repeat units of the formulae (I) and (X), or repeat units of the formulae (II) and (X), or repeat units of the formulae (I), (II) and (X),

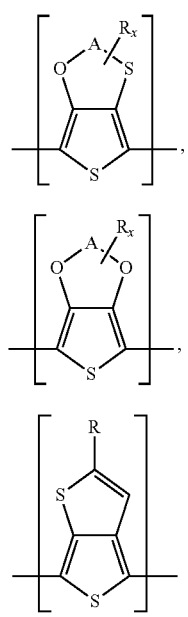

in which
A is an optionally substituted $C_1$-$C_5$-alkylene radical,
R is independently H, a linear or branched, optionally substituted $C_1$-$C_{18}$-alkyl radical, an optionally substituted $C_5$-$C_{12}$-cycloalkyl radical, an optionally substituted $C_6$-$C_{14}$-aryl radical, an optionally substituted $C_7$-$C_{18}$-aralkyl radical, an optionally substituted $C_1$-$C_4$-hydroxyalkyl radical or a hydroxyl radical,
x is an integer from 0 to 8 and,
in the case that a plurality of R radicals are bonded to A, they may be the same or different.

The general formulae (I) and (II) should be understood such that x substituents R may be bonded to the alkylene radical A.

Particular preference is given to polythiophenes with repeat units of the general formula (I) or (II) or repeat units of the general formulae (I) and (II), in which A is an optionally substituted $C_2$-$C_3$-alkylene radical and x is 0 or 1.

A very particularly preferred conjugated polymer b) is poly(3,4-ethylenedioxythiophene), which is optionally substituted.

In the context of the invention, the prefix "poly-" should be understood to mean that more than one identical or different repeat unit is present in the polymer or polythiophene. The polythiophenes contain a total of n repeat units of the general formula (I) or of the general formula (II) or of the general formula (X) or of the general formulae (I) and (II) or of the general formulae (I) and (X) or of the general formulae (II) and (X) or of the general formulae (I), (II) and (X), where n is an integer of 2 to 2000, preferably 2 to 100. The repeat units of the general formula (I) or of the general formula (II) or of the general formula (X) or the repeat units of the general formulae (I) and (II) or the repeat units of the general formulae (I) and (X) or the repeat units of the general formulae (II) and (X) or the repeat units of the general formulae (I), (II) and (X) may each be the same or different within a polythiophene. Preference is given to polythiophenes having in each case identical repeat units of the general formula (I) or of the general formula (II) or of the general formula (X) or having in each case identical repeat units of the general formulae (I) and (II), or of the general formulae (I) and (X), or of the general formulae (II) and (X), or having in each case identical repeat units of the general formulae (I), (II) and (X). Particular preference is given to polythiophenes having in each case identical repeat units of the general formula (I) or of the general formula (II) or having in each case identical repeat units of the general formulae (I) and (II).

At the end groups, the polythiophenes preferably each bear H.

In the context of the invention, $C_1$-$C_5$-alkylene radicals A are preferably methylene, ethylene, n-propylene, n-butylene or n-pentylene. $C_1$-$C_{18}$-Alkyl R is preferably linear or branched $C_1$-$C_{18}$-alkyl radicals such as methyl, ethyl, n- or isopropyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl or n-octadecyl, $C_5$-$C_{12}$-cycloalkyl radicals R are, for example, cyclopentyl, cyclohexyl, cycloheptyl, cyclooctyl, cyclononyl or cyclodecyl, $C_6$-$C_{14}$-aryl radicals R are, for example, phenyl or naphthyl, and $C_7$-$C_{18}$-aralkyl radicals R are, for example, benzyl, o-, m-, p-tolyl, 2,3-, 2,4-, 2,5-, 2,6-, 3,4-, 3,5-xylyl or mesityl. The above list serves to illustrate the invention by way of example and should not be considered to be exclusive.

In the context of the invention, any further substituents of the A radicals and/or of the R radicals include numerous organic groups, for example alkyl, cycloalkyl, aryl, aralkyl, alkoxy, halogen, ether, thioether, disulfide, sulfoxide, sulfone, sulfonate, amino, aldehyde, keto, carboxylic ester, carboxylic acid, carbonate, carboxylate, cyano, alkylsilane and alkoxysilane groups, and also carboxamide groups.

Possible substituents for polyaniline or polypyrrole include, for example, the A and R radicals listed above and/or the further substituents of the A and R radicals. Preference is given to unsubstituted polyanilines.

The scope of the invention encompasses all radical definitions, parameters and enumerations above and specified below, in general or within preferred ranges, with one another, i.e. including any combinations between the particular ranges and preferred ranges.

The polythiophenes used as conjugated polymers b) in the preferred process may be uncharged or cationic. In preferred embodiments, they are cationic, "cationic" relating only to the charges which reside on the main polythiophene chain.

According to the substituent on the R radicals, the polythiophenes may bear positive and negative charges in the structural unit, in which case the positive charges are on the main polythiophene chain and the negative charges are, if present, on the R radicals substituted by sulfonate or carboxylate groups. The positive charges of the main polythiophene chain may be partly or fully saturated by the anionic groups which may be present on the R radicals. Viewed overall, the polythiophenes in these cases may be cationic, uncharged or even anionic. Nevertheless, in the context of the invention, all are considered to be cationic polythiophenes, since the positive charges on the main polythiophene chain are crucial. The positive charges are not shown in the formulae, since their exact number and position cannot be stated unambiguously. The number of positive charges is, however, at least 1 and at most n, where n is the total number of all repeat units (identical or different) within the polythiophene.

To balance the positive charge, if this has not already been done by the optionally sulfonate- or carboxylate-substituted and thus negatively charged R radicals, the cationic polythiophenes require anions as counterions.

Counterions may be monomeric or polymeric anions, the latter also being referred to hereinafter as polyanions.

Polymeric anions are preferred over monomeric anions, since they contribute to film formation and, owing to their size, lead to thermally more stable, electrically conductive films.

Polymeric anions here may, for example, be anions of polymeric carboxylic acids, such as polyacrylic acids, polymethacrylic acid or polymaleic acids, or polymeric sulfonic acids, such as polystyrenesulfonic acids and polyvinylsulfonic acids. These polycarboxylic and —sulfonic acids may also be copolymers of vinylcarboxylic and vinylsulfonic acids with other polymerizable monomers, such as acrylic esters and styrene.

A preferred polymeric anion in the conjugated polymer b) is an anion of a polymeric carboxylic or sulfonic acid.

A particularly preferred polymeric anion is the anion of polystyrenesulfonic acid (PSS).

The molecular weight of the polyacids which afford the polyanions is preferably 1000 to 2 000 000, more preferably 2000 to 500 000. The polyacids or alkali metal salts thereof are commercially available, for example polystyrenesulfonic acids and polyacrylic acids, or else are preparable by known processes (see, for example, Houben Weyl, Methoden der organischen Chemie [Methods of Organic Chemistry], vol. E 20 Makromolekulare Stoffe [Macromolecular Substances], part 2, (1987), p. 1141 ff.).

Polymeric anion(s) and electrically conductive polymers may be present in the dispersion a) especially in a weight ratio of 0.5:1 to 50:1, preferably of 1:1 to 30:1, more preferably 2:1 to 20:1. The weight of the electrically conductive polymers corresponds here to the initial weight of the monomers used, assuming that there is full conversion in the polymerization.

The monomeric anions used are, for example, those of $C_1$-$C_{20}$-alkanesulfonic acids, such as those of methanesulfonic acid, ethanesulfonic acid, propanesulfonic acid, butanesulfonic acid or higher sulfonic acids such as dodecanesulfonic acid, of aliphatic perfluorosulfonic acids, such as trifluoro-methanesulfonic acid, perfluorobutanesulfonic acid or perfluorooctanesulfonic acid, of aliphatic $C_1$-$C_{20}$-carboxylic acids such as 2-ethylhexylcarboxylic acid, of aliphatic perfluorocarboxylic acids, such as trifluoroacetic acid or perfluorooctanoic acid, and aromatic sulfonic acids optionally substituted by $C_1$-$C_{20}$-alkyl groups, such as benzenesulfonic acid, o-toluenesulfonic acid, p-toluenesulfonic acid or dodecylbenzenesulfonic acid, and of cycloalkanesulfonic acids such as camphorsulfonic acid, or tetrafluoroborates, hexafluorophosphates, perchlorates, hexafluoroantimonates, hexafluoroarsenates or hexa-chloroantimonates.

Preferred monomeric anions are the anions of p-toluenesulfonic acid, methanesulfonic acid or camphor-sulfonic acid.

Cationic polythiophenes which contain anions as counterions to balance the charge are often also referred to in the technical field as polythiophene/(poly)anion complexes.

The solution or dispersion a) may also comprise further substances such as surface-active substances, for example ionic and/or nonionic surfactants; adhesion promoters, for example organofunctional silanes or hydrolyzates thereof, e.g. 3-glycidoxypropyl-trialkoxysilane, 3-aminopropyltriethoxysilane, 3-mercaptopropyltrimethoxysilane, 3-methacryloyloxy-propyltrimethoxysilane, vinyltrimethoxysilane or octyltriethoxysilane; crosslinkers such as melamine compounds, capped isocyanates, functional silanes—e.g. tetraethoxysilane, alkoxysilane hydrolyzates, for example based on tetraethoxysilane, epoxysilanes such as 3-glycidoxypropyltrialkoxysilane-polyurethanes, polyacrylates or polyolefin dispersions, or further additives.

In the context of the invention, the solution or dispersion a) may comprise surface-active substances, adhesion promoters, crosslinkers and further additives, either in each case alone or in any desired combination thereof.

The solutions or dispersions a) preferably comprise further additives which enhance the conductivity, for example compounds containing ether groups, for example tetrahydrofuran; compounds containing lactone groups, such as γ-butyrolactone, γ-valerolactone; compounds containing amide or lactam groups, such as caprolactam, N-methylcaprolactam, N,N-dimethylacetamide, N-methyl-acetamide, N,N-dimethylformamide (DMF), N-methyl-formamide, N-methylformanilide, N-methylpyrrolidone (NMP), N-octylpyrrolidone, pyrrolidone; sulfones and sulfoxides, for example sulfolane (tetramethylenesulfone), dimethyl sulfoxide (DMSO); sugars or sugar derivatives, for example sucrose, glucose, fructose, lactose, sugar alcohols, for example sorbitol, mannitol; imides, for example succinimide or maleimide; furan derivatives, for example 2-furancarboxylic acid, 3-furancarboxylic acid, and/or di- or polyalcohols, for example ethylene glycol, glycerol or di- or triethylene glycol. Particular preference is given to using, as conductivity-enhancing additives, tetrahydrofuran, N-methylformamide, N-methylpyrrolidone, ethylene glycol, dimethyl sulfoxide or sorbitol. The further additives may be present either in each case alone or in any desired combination thereof in the solution or dispersion a).

The solution or dispersion a) may have a pH of 1 to 14, preference being given to a pH of 1 to 10, particular preference to a pH of 1 to 8, the pH being measured at 25° C.

To adjust the pH, bases or acids, for example, can be added to the solutions or dispersions. The bases used may be inorganic bases, for example sodium hydroxide, potassium hydroxide, calcium hydroxide or ammonia, or organic bases, for example ethylamine, diethylamine, triethylamine, propylamine, dipropylamine, tripropylamine, isopropylamine, diisopropylamine, butylamine, dibutylamine, tributylamine, isobutylamine, diisobutylamine, triisobutylamine, 1-methylpropylamine, methylethylamine, bis(1-methyl)propylamine, 1,1-di-methylethylamine, pentylamine, dipentylamine, tripentylamine, 2-pentylamine, 3-pentylamine, 2-methyl-butylamine, 3-methylbutylamine, bis(3-methyl-butylamine), tris (3-methylbutylamine), hexylamine, octylamine, 2-ethylhexylamine, decylamine, N-methyl-butylamine, N-ethylbutylamine, N,N-dimethylethylamine, N,N-dimethylpropyl, N-ethyldiisopropylamine, allylamine, diallylamine, ethanolamine, diethanolamine, triethanolamine, methylethanolamine, methyl-diethanolamine, dimethylethanolamine, diethyl-ethanolamine, N-butylethanolamine, N-butyldiethanol-amine, dibutylethanolamine, cyclohexylethanolamine, cyclohexyldiethanolamine, N-ethylethanolamine, N-propylethanolamine, tert-butylethanolamine, tert-butyl-diethanolamine, propanolamine, dipropanolamine, tripropanolamine or benzylamine. The acids used may be inorganic acids, for example sulfuric acid, phosphoric acid or nitric acid, or organic acids, for example carboxylic or sulfonic acids. Preference is given to those additives which do not impair the film formation of the solutions or dispersions and remain in the solid electrolyte at relatively high temperatures, for example soldering temperatures, for example the bases dimethylethanolamine, diethanolamine, ammonia or triethanolamine, and the acid polystyrenesulfonic acid.

According to the method of application, the viscosity of the solution or dispersion a) may be between 0.1 and 100 000 mPa·s (measured at 20° C. and a shear rate of 100 s$^{-1}$ with a rheometer). The viscosity is preferably 1 to 10 000 mPa·s, more preferably between 10 and 1000 mPa·s, most preferably 30 to 500 mPa·s.

The electrically conductive material of the solid electrolyte may comprise a conductive polymer or nonpolymeric conductive material, for example charge transfer complexes, for example TCNQ (7,7,8,8-tetracyano-1,4-quinodimethane), manganese dioxide or salts, for example those which can form ionic liquids.

The solid electrolyte preferably comprises a conductive polymer. The conductive polymers used may be the above-mentioned conductive polymers which are also used for the polymeric outer layer. More preferably, the solid electrolyte comprises poly(3,4-ethylenedioxythiophene) as the conductive polymer; most preferably, the solid electrolyte comprises poly(3,4-ethylenedioxythiophene)/polystyrenesulfonic acid as the conductive polymer.

The solid electrolyte preferably forms, on the dielectric surface, a layer with a thickness less than 1000 nm, more preferably less than 200 nm, most preferably less than 50 nm.

The coverage of the dielectric with the solid electrolyte can be determined as follows: the capacitance of the capacitor is measured in the dry and moist states at 120 Hz. The coverage is the ratio of the capacitance in the dry state to the capacitance in the moist state, expressed in percent. "Dry state" means that the capacitor has been dried at elevated temperature (80-120° C.) over several hours before being analyzed. "Moist state" means that the capacitor is exposed to saturated air humidity under elevated pressure, for example in a steam boiler, over several hours. In the course of this, the moisture penetrates into pores not covered by the solid electrolyte, and acts there as a liquid electrolyte.

The coverage of the dielectric by the solid electrolyte is preferably greater than 50%, more preferably greater than 70%, most preferably greater than 80%.

Figure 2:
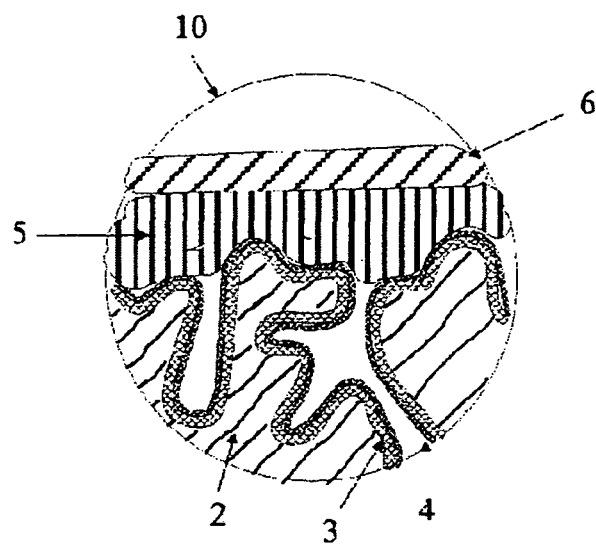

The polymeric outer layer is preferably present, as shown schematically and by way of example in FIG. 1 and FIG. 2, over the entire outer surface or a part of the outer surface of the capacitor body. The outer surface is understood to mean the outer faces of the capacitor body.

FIG. 1 describes a schematic diagram of the construction of a solid electrolytic capacitor using the example of a tantalum capacitor comprising
1 capacitor body
5 polymeric outer layer
6 graphite/silver layer
7 wire contact to electrode body 2
8 outer contacts
9 encapsulation
10 detail FIG. 2 describes the enlarged detail 10 from FIG. 1 of the schematic layer structure of the tantalum capacitor comprising
10 detail
2 porous electrode body (anode)
3 dielectric
4 solid electrolyte (cathode)
5 polymeric outer layer
6 graphite/silver layer When, instead of a porous sintered body, porous films, for example aluminum foils, are used as the electrode body, a similar construction to that described above arises in principle. In order to achieve higher capacitances, a plurality of films are preferably contact-connected and encapsulated together in parallel in one housing.

The thickness of the polymeric outer layer is preferably 1-1000 μm, more preferably 1-100 μm, even more preferably 2-50 μm, very especially preferably 4-20 μm. The layer thickness may vary on the outer surface. More particularly, the layer thickness may be thicker or thinner at the edges of the capacitor body than on the side faces of the capacitor body. However, preference is given to a virtually homogeneous layer thickness.

The polymeric outer layer may be part of a multilayer system which forms the outer layer of the capacitor body. It is also possible for further functional layers to be present on the polymeric outer layer. In addition, a plurality of polymeric outer layers may be present on the capacitor body.

In a particularly preferred embodiment, the electrolytic capacitor produced by the novel process comprises a solid electrolyte comprising poly(3,4-ethylenedioxythiophene) (PEDT) as the conductive material, and a polymeric outer layer comprising polystyrenesulfonic acid (PSS) and poly(3,4-ethylenedioxythiophene).

In a very particularly preferred embodiment, the electrolytic capacitor produced by the novel process comprises a solid electrolyte comprising PEDT/PSS and a polymeric outer layer comprising PEDT/PSS. The solid electrolytic capacitor produced by the processes according to the invention is notable for a low residual current, a low equivalent series resistance and a high thermal stability.

In principle, such an inventive electrolytic capacitor can be produced as follows: first, for example, a valve metal powder with a high surface area is compressed and sintered to a porous electrode body. This typically also involves pressing an electrical contact wire, preferably of a valve metal, for example tantalum, into the electrode body. It is alternatively also possible to etch metal foils in order to obtain a porous film.

The electrode body is, for example, coated by electrochemical oxidation with a dielectric, i.e. an oxide layer. On the dielectric, for example by means of oxidative polymerization, a conductive polymer is then deposited chemically or electrochemically and forms the solid electrolyte. To this end, precursors for preparing conductive polymers, one or more oxidizing agents, and if appropriate counterions are applied together or successively to the dielectric of the porous electrode body and polymerized chemically and oxidatively, or precursors for producing conductive polymers and counterions are polymerized by electrochemical polymerization on the dielectric of the porous electrode body. To form the solid electrolyte, the conductive materials used are preferably dispersions or solutions of conductive polymers, for example optionally substituted polythiophenes, polypyrroles or polyanilines. Preference is given to dispersions of conductive polythiophenes based on poly(3,4-ethylenedioxythiophene), as described, for example, in WO 2007/031206.

After producing the solid electrolyte, in accordance with the invention, a crosslinker e) and then a solution or dispersion a) comprising a conjugated polymer b), and a solvent or dispersant d) is applied to the capacitor body, and a polymeric outer layer is formed by at least partly removing the solvent or dispersant d). Optionally, the polymeric outer layer is aftertreated, in order to increase the conductivity of the conjugated polymer in the polymeric outer layer. The aftertreatment may consist, for example, of a thermal aftertreatment. Optionally, further layers are applied to the polymeric outer layer. A coating with layers of good conductivity, such as graphite and silver, serves as the electrode for discharging the current. Finally, the capacitor is contact-connected and encapsulated.

Additionally preferred is a process for producing electrolytic capacitors, characterized in that the electrode material is a valve metal or a compound with electrical properties comparable to a valve metal.

In the context of the invention, valve metals are understood to mean those metals whose oxide layers do not enable current flow in both directions equally: in the case of anodic voltage, the oxide layers of the valve metals block current flow, whereas cathodic voltage results in large currents which can destroy the oxide layer. The valve metals include Be, Mg, Al, Ge, Si, Sn, Sb, Bi, Ti, Zr, Hf, V, Nb, Ta and W, and also an alloy or compound of at least one of these metals with other elements. The best known representatives of the valve metals are Al, Ta, and Nb. Compounds with electrical properties comparable to a valve metal are those which have metallic conductivity, which are oxidizable and whose oxide layers have the above-described properties. For example, NbO possesses metallic conductivity, but is generally not considered to be a valve metal. Layers of oxidized NbO, however, have the typical properties of valve metal oxide layers, and so NbO or an alloy or compound of NbO with other elements are typical examples of such compounds with electrical properties comparable to a valve metal.

Preference is given to electrode materials composed of tantalum, aluminum and those electrode materials based on niobium or niobium oxide.

Electrode materials based on niobium or niobium oxide are understood to mean those materials in which niobium or niobium oxide constitutes the component with the greatest quantitative proportion.

The electrode material based on niobium or niobium oxide is preferably niobium, NbO, a niobium oxide $NbO_x$ where x may assume values of 0.8 to 1.2, niobium nitride, niobium oxynitride or mixtures of these materials, or an alloy or compound of at least one of these materials with other elements.

Preferred alloys are alloys with at least one valve metal, for example Be, Mg, Al, Ge, Si, Sn, Sb, Bi, Ti, Zr, Hf, V, Nb, Ta or W.

Accordingly, the term "oxidizable metal" means not just metals, but also an alloy or compound of a metal with other elements, provided that they possess metallic conductivity and are oxidizable.

The oxidizable metals are, for example, sintered in powder form to a porous electrode body, or a porous structure is imparted to a metallic body. The latter can be done, for example, by etching a film.

The porous electrode bodies are oxidized, for example, in a suitable electrolyte, for example phosphoric acid, by applying a voltage. The magnitude of this forming voltage depends on the oxide layer thickness to be achieved and/or the later application voltage of the capacitor. Preferred forming voltages are 1 to 800 V, more preferably 1 to 300 V.

To produce the electrode body, preferably metal powders with a specific charge of 1000 to 1 000 000 µC/g, more preferably with a specific charge of 5000 to 500 000 µC/g, even more preferably with a specific charge of 5000 to 300 000 µC/g, exceptionally preferably with a specific charge of 10 000 to 200 000 µC/g, are used.

The specific charge of the metal powder is calculated as follows:

specific charge of the metal powder=
(capacitance*anodization voltage)/weight of the
oxidized electrode body.

The capacitance is determined from the capacitance of the oxidized electrode body measured at 120 Hz in an aqueous electrolyte. The electrical conductivity of the electrolyte is sufficiently great that, at 120 Hz, there is still no decline in the capacitance owing to the electrical resistivity of the electrolyte. For example, 18% aqueous sulfuric acid electrolytes are used for the measurement.

The electrode bodies used have a porosity of 10 to 90%, preferably of 30 to 80%, more preferably of 50 to 80%.

The porous electrode bodies have a mean pore diameter of 10 to 10 000 nm, preferably of 50 to 5000 nm, more preferably of 100 to 3000 nm.

Accordingly, the present invention more preferably provides a process for producing electrolytic capacitors, characterized in that the valve metal or the compound of electrical properties comparable to a valve metal is tantalum, niobium, aluminum, titanium, zirconium, hafnium, vanadium, an alloy or compound of at least one of these metals with other elements, NbO or an alloy or compound of NbO with other elements.

The dielectric consists preferably of an oxide of the electrode material. It optionally comprises further elements and/or compounds.

The capacitance of the capacitor depends not only on the type of dielectric but also on the surface area and the thickness of the dielectric. The specific charge is a measure of how much charge per unit weight the oxidized electrode body can accommodate. The specific charge of the capacitor is calculated as follows:

specific charge of the capacitor=(capacitance*rated
voltage)/weight of the oxidized electrode body.

The capacitance is determined from the capacitance of the finished capacitor measured at 120 Hz and the rated voltage is the specified use voltage of the capacitor. The weight of the oxidized electrode body is based on the simple weight of the dielectric-coated porous electrode material without polymer, contacts and encapsulations.

The electrolytic capacitors produced by the novel process preferably have a specific charge of 500 to 500 000 µC/g, more preferably a specific charge of 2500 to 250 000 µC/g, even more preferably a specific charge of 2500 to 1 500 000 µC/g, exceptionally preferably a specific charge of 5000 to 100 000 µC/g.

Precursors for the preparation of the conjugated polymers b) in the solution or dispersion a), also referred to hereinafter as precursors, are understood to mean appropriate monomers or derivatives thereof. It is also possible to use mixtures of different precursors. Suitable monomeric precursors are, for example, optionally substituted thiophenes, pyrroles or anilines, preferably optionally substituted thiophenes, more preferably optionally substituted 3,4-alkylenedioxythiophenes, 3,4-alkyleneoxythiathiophenes or thieno[3,4-b]thiophenes.

Examples of optionally substituted 3,4-alkylenedioxythiophenes, 3,4-alkyleneoxythiathiophenes or thieno[3,4-b]thiophenes include the compounds of the general formula (III) or of the general formula (IV) or of the general formula (XI) or a mixture of thiophenes of the general formulae (III) and (IV) or a mixture of thiophenes of the general formula (III) and (XI), or a mixture of thiophenes of the general formula (IV) and (XI) or a mixture of thiophenes of the general formula (III), (IV) and (XI)

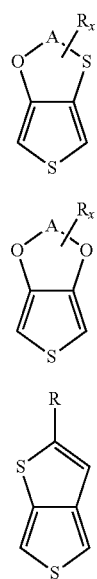

(III)

(IV)

(XI)

in which
A is an optionally substituted $C_1$-$C_5$-alkylene radical, preferably an optionally substituted $C_2$-$C_3$-alkylene radical,
R is a linear or branched, optionally substituted $C_1$-$C_{18}$-alkyl radical, preferably linear or branched, optionally substituted $C_1$-$C_{14}$-alkyl radical, an optionally substituted $C_5$-$C_{12}$-cycloalkyl radical, an optionally substituted $C_6$-$C_{14}$-aryl radical, an optionally substituted $C_7$-$C_{18}$-aralkyl radical, an optionally substituted $C_1$-$C_4$-hydroxyalkyl radical, preferably optionally substituted $C_1$-$C_2$-hydroxyalkyl radical, or a hydroxyl radical,
x is an integer of 0 to 8, preferably of 0 to 6, more preferably 0 or 1, and,
in the case that a plurality of R radicals are bonded to A, they may be the same or different.

Very particularly preferred monomeric precursors are optionally substituted 3,4-ethylenedioxythiophenes.

Examples of substituted 3,4-ethylenedioxythiophenes include the compounds of the general formula (V)

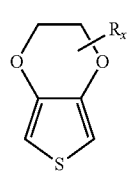

(V)

in which
R and x are each as defined for the general formulae (III) and (IV).

In the context of the invention, derivatives of these monomeric precursors are understood, for example, to mean dimers or trimers of these monomeric precursors. Also possible as derivatives are higher molecular weight derivatives, i.e. tetramers, pentamers, etc., of the monomeric precursors.

Examples of derivatives of substituted 3,4-alkylenedioxythiophenes include the compounds of the general formula (VI)

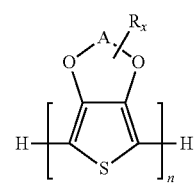

(VI)

in which
n is an integer of 2 to 20, preferably 2 to 6, more preferably 2 or 3,
and
A, R and x are each as defined for the general formulae (III) and (IV).

The derivatives may be formed either from identical or different monomer units and be used in pure form or in a mixture with one another and/or with the monomeric precursors. Oxidized or reduced forms of these precursors are, in the context of the invention, also encompassed by the term "precursors", provided that their polymerization forms the same conductive polymers as for the precursors detailed above.

Useful substituents for the above-specified precursors, especially for the thiophenes, preferably for the 3,4-alkylenedioxythiophenes, include the R radicals specified for the general formulae (III), (IV) or (XI).

Useful substituents for pyrroles and anilines include, for example, the A and R radicals detailed above and/or the further substituents of the A and R radicals.

Any further substituents of the A and/or the R radicals include the organic groups specified in connection with the general formulae (I), (II) or (X).

Processes for preparing the monomeric precursors for the preparation of conductive polymers and the derivatives thereof are known to those skilled in the art and are described, for example, in L. Groenendaal, F. Jonas, D. Freitag, H. Pielartzik & J. R. Reynolds, Adv. Mater. 12 (2000) 481-494 and literature cited therein.

The 3,4-alkyleneoxythiathiophenes of the formula (III) required for the preparation of the polythiophenes to be used are known to those skilled in the art or are preparable by known processes (for example according to P. Blanchard, A. Cappon, E. Levillain, Y. Nicolas, P. Frere and J. Roncali, Org. Lett. 4 (4), 2002, p. 607-609).

The thieno[3,4-b]thiophenes of the formula (XI) required for the preparation of the polythiophenes to be used are known to those skilled in the art or are preparable by known processes (for example according to US2004/0074779A1).

The dispersions are prepared from the above-described precursors, for example, analogously to the conditions specified in EP-A 440 957. An improved variant for the preparation of the dispersions is that of using ion exchangers to remove the inorganic salt content or a portion thereof. Such a variant is described, for example, in DE-A 19627071. The ion exchanger can, for example, be stirred with the product, or the product is conducted through a column filled with ion exchange column.

Preparation of a polyaniline/polyanion or polythiophene/polyanion complex and subsequent dispersion or redispersion in one or more solvent(s) is also possible.

The solids content of the conjugated polymer b) in the solution or dispersion a) is 0.1-90% by weight, preferably 0.5-30% by weight and most preferably 0.5-10% by weight.

The solutions or dispersions a) are applied to the capacitor body by known processes, for example by spin-coating, impregnating, casting, dropwise application, spraying, knife-coating, painting or printing, for example inkjet printing, screenprinting or pad printing.

After the solution or dispersion a) has been applied, the solvent or dispersant d) is preferably removed, in order that the conjugated polymer b) and any further additives in the solution or dispersion a) can form the polymeric outer layer. However, it is also possible for at least a portion of the solvent or dispersant d) to remain in the polymeric outer layer. According to the type of solvent or dispersant d), it can also be cured either fully or only the portion still remaining after partial removal.

The solvent or dispersant d) can be removed after the solution or dispersion has been applied by simple evaporation at room temperature. To achieve higher processing speeds, it is, however, more advantageous to remove the solvents or dispersants d) at elevated temperatures, for example at temperatures of 20 up to 300° C., preferably 40 up to 250° C. A thermal aftertreatment can be undertaken directly with the removal of the solvent or else at a different time from the completion of the coating.

Depending on the kind of solution or dispersion used for the coating, the duration of the heat treatment is 5 seconds to several hours. For the thermal treatment, it is also possible to use temperature profiles with different temperatures and residence times.

The heat treatment can be performed, for example, in such a way that the coated oxidized electrode bodies are moved through a heated chamber at the desired temperature at such a speed that the desired residence time at the selected temperature is achieved, or contacted with a hotplate at the desired temperature for the desired residence time. In addition, the thermal treatment can, for example, be effected in an oven or several ovens with different temperatures.

After the polymeric outer layer has been produced, further layers of good conductivity, for example graphite and/or silver layers, may preferably be applied to the capacitor, and the capacitor is connected to contacts and encapsulated.

The process according to the invention makes it possible to produce, in a particularly simple manner, solid electrolytic capacitors with a polymeric outer layer, which is impervious even at the edges and corners of the capacitor body. The solid electrolytic capacitors are notable for a low ESR, low residual currents and a high thermal stability. The electrolytic capacitors produced by the process according to the invention thus likewise form part of the subject-matter of the present invention.

The electrolytic capacitors produced in accordance with the invention are outstandingly suitable, owing to their low residual current and their low ESR, for use as a component in electronic circuits, for example as filter capacitors or decoupling capacitors. The use also forms part of the subject-matter of the invention. Preference is given to electronic circuits, as present, for example, in computers (desktops, laptops, servers), in computer peripherals (e.g. PC cards), in portable electronic devices, for example cellphones, digital cameras or amusement electronics, in devices for amusement electronics, for example in CD/DVD players and computer game consoles, in navigation systems, in telecommunications equipment, in domestic appliances, in voltage supplies or in automotive electronics.

The examples which follow serve to illustrate the invention by way of example and should not be interpreted as a restriction.

EXAMPLES

Example 1

Preparation of Dispersions of Conductive Polymers

Dispersion A)

A 5 l glass reactor with stirrer and thermometer was initially charged with 1736 g of deionized water, 660 g of an aqueous polystyrenesulfonic acid solution with a mean molecular weight (weight average $M_w$) of 70 000 and a solids content of 3.8% by weight. The reaction temperature was kept between 20 and 25° C. With stirring, 10.2 g of 3,4-ethylenedioxythiophene were added. The solution was stirred for 30 minutes (min). Subsequently, 0.06 g of iron(III) sulfate and 19 g of sodium persulfate were added and the solution was stirred for a further 24 hours (h). After the reaction had ended, inorganic salts were removed using 200 ml of a strongly acidic cation exchanger (Lewatit S100, Lanxess AG) and 500 ml of a weakly basic anion exchanger (Lewatit MP 62, Lanxess AG), and the solution was stirred for a further 2 h. The ion exchanger was filtered off.

To determine the solids content, 5 g of the dispersion were dried at 100° C. for 14 hours. Dispersion A had a solids content of 1%.

Dispersion A had the following particle size distribution:
$d_{10}$ 60 nm
$d_{50}$ 163 nm
$d_{90}$ 271 nm The diameter of the particles b) of the conductive polymer is based on a mass distribution of the particles b) in the dispersion as a function of particle diameter. The determination was effected by means of an ultracentrifuge measurement. The particle size was determined in the swollen state of the particles.

Dispersion B)

A portion of the PEDT/PSS dispersion A was homogenized ten times at a pressure of 700 bar with a high-pressure homogenizer.

The dispersion B thus prepared had the following particle size distribution:
$d_{10}$ 20 nm
$d_{50}$ 28 nm
$d_{90}$ 44 nm The solids content of dispersion B was 1%.

10 g of dispersion B were admixed with 0.5 g of dimethyl sulfoxide (DMSO) and stirred to form a dispersion. A portion of this dispersion was spun onto a microscope slide (26 mm*26 mm*1 mm) by means of a spin-coater (Chemat Technology KW-4A). The sample was dried at 120° C. for 10 min. Subsequently, two opposite edges of the microscope slide were coated with conductive silver. After the conductive silver had been dried, the two silver strips were connected to contacts and a Keithley 199 multimeter was used to determine the surface resistivity. The layer thickness was determined with a Tencor Alpha Step 500 Surface Profiler. Surface resistivity and layer thickness d were used to determine specific conductivity σ according to $\sigma=1/(R_\square *d)$. The layer thickness was 75 nm and the specific conductivity was 430 S/cm.

The viscosity of the dispersion was 30 mPa*s at a shear rate of 100 Hz and 20° C.

An ICP analysis of the metal contents of dispersion B gave the following values:
magnesium (Mg): 0.62 mg/kg
aluminum (Al): 1.1 mg/kg
silicon (Si): 1.3 mg/kg
phosphorus (P): 6.3 mg/kg
potassium (K): 0.71 mg/kg
calcium (Ca): 4.0 mg/kg
chromium (Cr): 0.17 mg/kg
iron (Fe): 1.07 mg/kg
zinc (Zn): <0.01 mg/kg Dispersion C)

A portion of the PEDT/PSS dispersion A) was concentrated in a rotary evaporator to a solids content of 1.5%. In a beaker with a stirrer, 160 g of this concentrated dispersion PEDT/PSS dispersion A), 28 g of water, 6 g of a sulfo polyester (Eastek 1100, solids content 30%, mean molecular weight 10 000-15 000, Eastman), 8 g of dimethyl sulfoxide, 1 g of 3-glycidoxypropyltrimethoxysilane (Silquest A-187, OSi Specialties) and 0.4 g of wetting agent (Dynol 604, Air Products) were mixed vigorously for one hour. This dispersion C) thus obtained had a solids content of 2.7% and a viscosity of 188 mPas. The specific conductivity was 205 S/cm.

Dispersion D)

A 5 l glass reactor with stirrer and thermometer was initially charged with 2.5 l of demineralized water. While stirring, 214.2 g of p-toluenesulfonic acid monohydrate and 2.25 g of iron(III) sulfate heptahydrate were introduced. Once everything had dissolved, 85.8 g of 3,4-ethylenedioxythiophene were added and the mixture was stirred for 30 minutes. Subsequently, 192.9 g of sodium peroxodisulfate were introduced with stirring and the mixture was stirred at room temperature for a further 24 hours. After the reaction had ended, the PEDT/p-toluenesulfonate powder formed was filtered off on a porcelain suction filter, washed with 3 l of demineralized water and finally dried at 100° C. for 6 hours. 89 g of a blue-black PEDT-toluenesulfonate powder were obtained.

In a beaker with a stirrer, 170 g of the PEDT/PSS dispersion A) from Example 1, 15 g of a sulfo polyester (Eastek 1100, Eastman), 8 g of dimethyl sulfoxide, 1 g of 3-glycidoxypropyltrimethoxysilane (Silquest A-187, OSi Specialties) and 0.4 g of wetting agent (Dynol 604, Air Products) were mixed vigorously for one hour. Subsequently, 6 g of the PEDT/toluenesulfonate powder were dispersed in by means of a ball mill dissolver unit. To this were added 300 g of zirconium oxide beads (Ø 1 mm) and the mixture was stirred while cooling with water at 7000 rpm for 1 hour. Finally, the milling beads were removed by means of a 0.8 μm sieve. The dispersion D) thus produced had a solids content of 7%.

Example 2

Preparation of Solutions Which Comprise a Crosslinker

Solution 1) Preparation of an Inventive Crosslinker e)

A beaker with a stirrer was initially charged with 0.01 mol of 1,4-bis(3-aminopropyl)piperazine, and 75 ml of demineralized water were added with stirring. Subsequently, while stirring, a sufficient amount of para-toluenesulfonic acid monohydrate for the solution to reach a pH of 4 was added. The pH was determined with pH paper at 25° C. Finally, a sufficient amount of demineralized water was added to obtain a total solution volume of 100 ml and hence a 0.1 molar solution.

Solution 2) Preparation of an Inventive Crosslinker e)

A beaker with a stirrer was initially charged with 0.01 mol of aluminum sulfate and, while stirring, 75 ml of demineralized water were added. Subsequently, while stirring, a sufficient amount of para-toluenesulfonic acid monohydrate for the solution to reach a pH of 5 was added, and, finally, a sufficient amount of demineralized water to obtain a total solution volume of 100 ml and hence a 0.1 molar solution was added.

Solution 3) Preparation of an Inventive Crosslinker e)

A beaker with a stirrer was initially charged with 0.01 mol of 4,4',4''-methylidinetris(N,N-dimethylaniline) (formula XXII) and, while stirring, 75 ml of demineralized water were added. Subsequently, while stirring, a sufficient amount of para-toluenesulfonic acid monohydrate for the solution to reach a pH of 5 was added, and, finally, a sufficient amount of demineralized water to obtain a total solution volume of 100 ml and hence a 0.1 molar solution was added.

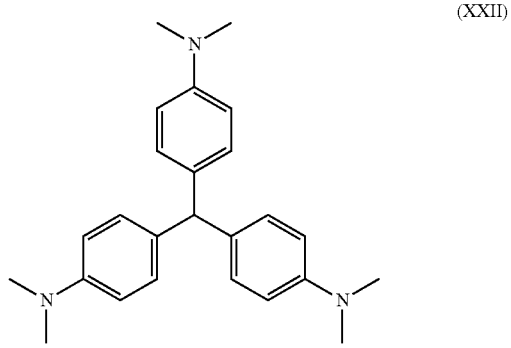

(XXII)

Solution 4) Preparation of an Inventive Crosslinker e)

A beaker with a stirrer was initially charged with 0.01 mol of N,N,N',N'-tetramethylethylenediamine and, while stirring, 75 ml of demineralized water were added. Subsequently, while stirring, a sufficient amount of para-toluenesulfonic acid monohydrate for the solution to reach a pH of 5 was added, and, finally, a sufficient amount of demineralized water to obtain a total solution volume of 100 ml and hence a 0.1 molar solution was added.

Solution 5) Preparation of an Inventive Crosslinker e)

A beaker with a stirrer was initially charged with 0.01 mol of 1,8-diaminooctane and, while stirring, 75 ml of demineralized water were added. Subsequently, while stirring, a sufficient amount of 18% by weight sulfuric acid for the solution to reach a pH of 4 was added, and, finally, a sufficient amount of demineralized water to obtain a total solution volume of 100 ml and hence a 0.1 molar solution was added.

Solution 6) Preparation of an Inventive Crosslinker e)

A beaker with a stirrer was initially charged with 0.01 mol of magnesium sulfate and, while stirring, 75 ml of demineralized water were added. Subsequently, while stirring, a sufficient amount of para-toluenesulfonic acid monohydrate for the solution to reach a pH of 4 was added, and, finally, a sufficient amount of demineralized water to obtain a total solution volume of 100 ml and hence a 0.1 molar solution was added.

Solution 7) Preparation of an Inventive Crosslinker e)

A beaker with a stirrer was initially charged with 0.01 mol of N,N,N,N',N',N'-hexamethylhexamethylenediammonium dibromide and, while stirring, 75 ml of demineralized water were added. Subsequently, while stirring, a sufficient amount of para-toluenesulfonic acid monohydrate for the solution to reach a pH of 4 was added, and, finally, a sufficient amount of demineralized water to obtain a total solution volume of 100 ml and hence a 0.1 molar solution was added.

Solution 8) Preparation of an Inventive Crosslinker e)

A beaker with a stirrer was initially charged with 0.01 mol of copper sulfate and, while stirring, 75 ml of demineralized water were added. Subsequently, while stirring, a sufficient amount of 18% by weight sulfuric acid for the solution to reach a pH of 5 was added, and, finally, a sufficient amount of demineralized water to obtain a total solution volume of 100 ml and hence a 0.1 molar solution was added.

Solution 9) Preparation of an Inventive Crosslinker e)

A beaker with a stirrer was initially charged with 0.01 mol of the substance designated with formula XXIV and, while stirring, 75 ml of demineralized water were added. Subsequently, while stirring, a sufficient amount of para-toluenesulfonic acid monohydrate for the solution to reach a pH of 4 was added, and, finally, a sufficient amount of demineralized water to obtain a total solution volume of 100 ml and hence a 0.1 molar solution was added.

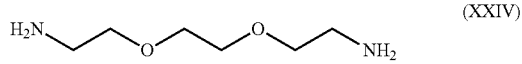

(XXIV)

Solution 10) Preparation of an Inventive Crosslinker e)

A beaker with a stirrer was initially charged with 0.01 mol of L-lysine and, while stirring, 75 ml of demineralized water were added. Subsequently, while stirring, a sufficient amount of para-toluenesulfonic acid monohydrate for the solution to reach a pH of 5 was added, and, finally, a sufficient amount of demineralized water to obtain a total solution volume of 100 ml and hence a 0.1 molar solution was added.

Solution 11) Preparation of an Inventive Crosslinker e)

A beaker with a stirrer was initially charged with 0.01 mol of zinc sulfate and, while stirring, 75 ml of demineralized water were added. Subsequently, while stirring, a sufficient amount of 18% by weight sulfuric acid for the solution to reach a pH of 4 was added, and, finally, a sufficient amount of demineralized water to obtain a total solution volume of 100 ml and hence a 0.1 molar solution was added.

Solution 12) Preparation of an Inventive Crosslinker e)

A beaker with a stirrer was initially charged with 0.01 mol of ethylenediamine and, while stirring, 75 ml of demineralized water were added. Subsequently, while stirring, a sufficient amount of para-toluenesulfonic acid monohydrate for the solution to reach a pH of 4 was added, and, finally, a sufficient amount of demineralized water to obtain a total solution volume of 100 ml and hence a 0.1 molar solution was added.

Solution 13) Preparation of an Inventive Crosslinker e)

A beaker with a stirrer was initially charged with 60 ml of ethanol, and 60 ml of demineralized water were added while stirring. This solvent mixture is referred to hereinafter as "50/50 mixture". A beaker with a stirrer was initially charged with 0.01 mol of ethylenediamine and 75 ml of "50/50 mixture" were added while stirring. Subsequently, while stirring, a sufficient amount of para-toluenesulfonic acid monohydrate for the solution to reach a pH of 4 was added, and finally a sufficient amount of "50/50 mixture" to obtain a total solution volume of 100 ml and hence a 0.1 molar solution was added.

Solution 14) Preparation of an Inventive Crosslinker e)

A beaker with a stirrer was initially charged with 0.01 mol of 1,8-diaminooctane and, while stirring, 75 ml of ethanol were added. Subsequently, while stirring, a sufficient amount of para-toluenesulfonic acid monohydrate for the solution to reach a pH of 5 was added, and, finally, a sufficient amount of ethanol to obtain a total solution volume of 100 ml and hence a 0.1 molar solution was added. The pH was determined at 25° C. with pH paper which had been moistened with demineralized water.

Solution 15) Preparation of an Inventive Crosslinker e)

A beaker with a stirrer was initially charged with 100 ml of ethanol, and 25 ml of demineralized water were added while stirring. This solvent mixture is referred to hereinafter as "80/20 mixture". A beaker with a stirrer was initially charged with 0.02 mol of 1,10-diaminodecane and 75 ml of "80/20 mixture" were added while stirring. Subsequently, while stirring, a sufficient amount of para-toluenesulfonic acid monohydrate for the solution to reach a pH of 4 was added, and finally a sufficient amount of "80/20 mixture" to obtain a total solution volume of 100 ml and hence a 0.2 molar solution was added.

Solution 16) Preparation of an Inventive Crosslinker e)

A beaker with a stirrer was initially charged with 0.01 mol of 1,10-diaminodecane and, while stirring, 75 ml of ethanol were added. Subsequently, while stirring, a sufficient amount of para-toluenesulfonic acid monohydrate for the solution to reach a pH of 5 was added, and, finally, a sufficient amount of ethanol to obtain a total solution volume of 100 ml and hence a 0.1 molar solution was added.

Solution 17) Preparation of an Inventive Crosslinker e)

A beaker with a stirrer was initially charged with 0.01 mol of 1,10-diaminodecane and, while stirring, 75 ml of ethanol were added. Finally, a sufficient amount of ethanol to obtain a total solution volume of 100 ml and hence a 0.1 molar solution was added. The solution had a pH of 11.

Solution 18) Preparation of an Inventive Crosslinker e)

A beaker with a stirrer was initially charged with 0.01 mol of ethylenediamine and, while stirring, 75 ml of demineralized water were added. Subsequently, while stirring, a sufficient amount of 18% by weight sulfuric acid for the solution to reach a pH of 7 was added, and, finally, a sufficient amount of demineralized water to obtain a total solution volume of 100 ml and hence a 0.1 molar solution was added. The solution had a pH of 11.

Solution 19) Preparation of an Inventive Crosslinker e)

A beaker with a stirrer was initially charged with 0.01 mol of ethylenediamine and, while stirring, 75 ml of demineralized water were added. Finally, a sufficient amount of demineralized water to obtain a total solution volume of 100 ml and hence a 0.1 molar solution was added. The solution had a pH of 11.

Solution 20) Preparation of a Noninventive Crosslinker

A beaker with a stirrer was initially charged with 0.01 mol of ammonium sulfate and, while stirring, 75 ml of demineralized water were added. Finally, a sufficient amount of demineralized water to obtain a total solution volume of 100 ml and hence a 0.1 molar solution was added. The solution had a pH of 5.

Solution 21) Preparation of a Noninventive Crosslinker

A beaker with a stirrer was initially charged with 0.01 mol of (3-glycidyloxypropyl)trimethoxysilane, and, while stirring, a sufficient amount of methanol to obtain a total solution volume of 100 ml and hence a 0.1 molar solution was added.

Solution 22) Preparation of a Noninventive Crosslinker

A beaker with a stirrer was initially charged with 0.01 mol of trimethyloctadecylammonium bromide, and 75 ml of methanol were added while stirring. Subsequently, while stirring, a sufficient amount of para-toluenesulfonic acid monohydrate for the solution to reach a pH of 5 was added, and, finally, a sufficient amount of methanol to obtain a total solution volume of 100 ml and hence a 0.1 molar solution was added.

Solution 23) Preparation of a Noninventive Crosslinker

A beaker with a stirrer was initially charged with 75 ml of demineralized water and, while stirring, a sufficient amount of 20% by weight aqueous ammonia solution for the solution to reach a pH of 5 was added. Finally, a sufficient amount of demineralized water to obtain a total solution volume of 100 ml was added.

Solution 24) Preparation of a Noninventive Crosslinker

A beaker with a stirrer was initially charged with 0.01 mol of L-cysteine and, while stirring, 75 ml of demineralized water were added. Finally, while stirring, a sufficient amount of 18% by weight sulfuric acid for the solution to reach a pH of 4 was added, and, finally, a sufficient amount of demineralized water to obtain a total solution volume of 100 ml and hence a 0.1 molar solution was added.

Solution 25) Preparation of a Noninventive Crosslinker

A beaker with a stirrer was initially charged with 0.01 mol of L-methionine and, while stirring, 75 ml of demineralized water were added. Subsequently, while stirring, a sufficient amount of para-toluenesulfonic acid monohydrate for the solution to reach a pH of 4 was added, and, finally, a sufficient amount of demineralized water to obtain a total solution volume of 100 ml and hence a 0.1 molar solution was added.

Solution 26) Preparation of a Noninventive Crosslinker

A beaker with a stirrer was initially charged with 0.01 mol of dimethyldioctadecylammonium bromide and, while stirring, 75 ml of ethanol were added. Subsequently, while stirring, a sufficient amount of 18% by weight sulfuric acid for the solution to reach a pH of 5 was added, and, finally, a sufficient amount of ethanol to obtain a total solution volume of 100 ml and hence a 0.1 molar solution was added.

Solution 27) Preparation of a Noninventive Crosslinker e)

A beaker with a stirrer was initially charged with 0.01 mol of 1,8-diaminooctane and, while stirring, 75 ml of ethanol were added. Subsequently, while stirring, a sufficient amount of dinonylnaphthalenedisulfonic acid for the solution to reach a pH of 5 was added, and, finally, a sufficient amount of ethanol to obtain a total solution volume of 100 ml and hence a 0.1 molar solution was added.

Solution 28) Preparation of a Noninventive Crosslinker e)

A beaker with a stirrer was initially charged with 0.01 mol of 1,12-diaminododecane and, while stirring, 75 ml of ethanol were added. Subsequently, while stirring, a sufficient amount of dinonylnaphthalenesulfonic acid for the solution to reach a pH of 5 was added, and, finally, a sufficient amount of ethanol to obtain a total solution volume of 100 ml and hence a 0.1 molar solution was added.

Solution 29) Preparation of an Inventive Crosslinker e)

A beaker with a stirrer was initially charged with 0.01 mol of 1,4-piperazinedicarboxaldehyde and, while stirring, 75 ml of ethanol were added. Subsequently, while stirring, a sufficient amount of para-toluenesulfonic acid monohydrate for the solution to reach a pH of 5 was added, and, finally, a sufficient amount of ethanol to obtain a total solution volume of 100 ml and hence a 0.1 molar solution was added.

Solution 30) Preparation of an Inventive Crosslinker e)

A beaker with a stirrer was initially charged with 0.01 mol of N,N'-hexamethylenebisacetamide and, while stirring, 75 ml of demineralized water were added. Subsequently, while stirring, a sufficient amount of para-toluenesulfonic acid monohydrate for the solution to reach a pH of 4 was added, and, finally, a sufficient amount of demineralized water to obtain a total solution volume of 100 ml and hence a 0.1 molar solution was added.

Example 3

Production of Capacitors by the Process According to the Invention 3.1. Production of Oxidized Electrode Bodies:

Tantalum powder with a specific capacitance of 18 000 µFV/g was pressed to pellets with incorporation of a tantalum wire and sintered in order to form an electrode body with the dimensions of 1.5 mm×2.9 mm×4.0 mm. 10 of these porous electrode bodies were anodized to 100 V in a phosphoric acid electrolyte to form a dielectric.

3.2 Production of the Solid Electrolyte 100 g of dispersion B from Example 1 and 4 g of dimethyl sulfoxide (DMSO) were mixed vigorously in a beaker with a stirrer to give a dispersion B1.

The oxidized electrode bodies were impregnated in this dispersion B1 for 1 min. This was followed by drying at 120° C. for 10 min. Impregnation and drying were carried out nine further times.

3.3 Production of a Polymeric Outer Layer Using the Inventive Crosslinker e)

The capacitor bodies were impregnated in solution 1 from Example 2 and then dried at 120° C. for 10 min.

The capacitor bodies were impregnated in dispersion C from Example 1 and then dried at 120° C. for 10 min.

The corner and edge coverage of the capacitor bodies with the polymeric outer layer was assessed by visual assessment with the aid of a light microscope. Information regarding the coverage of the corners and edges of the electrode bodies can be found in Table 1.

Finally, the electrode bodies were coated with a graphite layer and a silver layer.

The residual current (in microampere) was determined with a Keithley 199 multimeter three minutes after applying a voltage of 33 V. A mean value for the residual current of the 10 capacitors produced in the above manner can be found in Table 1.

Example 4

Production of Capacitors by the Process According to the Invention 10 capacitors were produced as in Example 3, except that the capacitor bodies were impregnated in solution 2 from Example 2 instead of in solution 1 from Example 2.

Information regarding the coverage of the corners and edges of the electrode bodies can be found in Table 1.

Example 5

Production of Capacitors by the Process According to the Invention 10 capacitors were produced as in Example 3, except that the capacitor bodies were impregnated in solution 3 from Example 2 instead of in solution 1 from Example 2.

Information regarding the coverage of the corners and edges of the electrode bodies can be found in Table 1.

Example 6

Production of Capacitors by the Process According to the Invention 10 capacitors were produced as in Example 3, except that the capacitor bodies were impregnated in solution 12 from Example 2 instead of in solution 1 from Example 2.

Information regarding the coverage of the corners and edges of the electrode bodies can be found in Table 1.

Example 7

Production of Capacitors by the Process According to the Invention 10 capacitors were produced as in Example 3, except that the capacitor bodies were impregnated in solution 29 from Example 2 instead of in solution 1 from Example 2.
Information regarding the coverage of the corners and edges of the electrode bodies can be found in Table 1.

Example 8

Production of Capacitors by the Process According to the Invention 10 capacitors were produced as in Example 3, except that the capacitor bodies were impregnated in solution 30 from Example 2 instead of in solution 1 from Example 2.
Information regarding the coverage of the corners and edges of the electrode bodies can be found in Table 1.

Comparative Example 1

Production of Capacitors Without Use of the Inventive Crosslinker e)

10 capacitors were produced as in Example 3, but without using the inventive crosslinker e), i.e. without impregnating the capacitor bodies in solution 1 from Example 2.
Information regarding the coverage of the corners and edges of the electrode bodies can be found in Table 1.

Comparative Example 2

Production of Capacitors Without Using the Inventive Crosslinker e)

10 capacitors were produced as in Example 3, except that the capacitor bodies were impregnated in solution 20 from Example 2 instead of in solution 1 from Example 2.
Information regarding the coverage of the corners and edges of the electrode bodies can be found in Table 1.

Comparative Example 3

Production of Capacitors Without Using the Inventive Crosslinker e)

10 capacitors were produced as in Example 3, except that the capacitor bodies were impregnated in solution 21 from Example 2 instead of in solution 1 from Example 2.
Information regarding the coverage of the corners and edges of the electrode bodies can be found in Table 1.

Comparative Example 4

Production of Capacitors Without Using the Inventive Crosslinker e)

10 capacitors were produced as in Example 3, except that the capacitor bodies were impregnated in solution 22 from Example 2 instead of in solution 1 from Example 2.

Information regarding the coverage of the corners and edges of the electrode bodies can be found in Table 1.

Comparative Example 5

Production of Capacitors Without Using the Inventive Crosslinker e)

10 capacitors were produced as in Example 3, except that the capacitor bodies were impregnated in solution 23 from Example 2 instead of in solution 1 from Example 2.
Information regarding the coverage of the corners and edges of the electrode bodies can be found in Table 1.

Comparative Example 6

Production of Capacitors Without Using the Inventive Crosslinker e)

10 capacitors were produced as in Example 3, except that the capacitor bodies were impregnated in solution 24 from Example 2 instead of in solution 1 from Example 2.
Information regarding the coverage of the corners and edges of the electrode bodies can be found in Table 1.

Comparative Example 7

Production of Capacitors Without Using the Inventive Crosslinker e)

10 capacitors were produced as in Example 3, except that the capacitor bodies were impregnated in solution 25 from Example 2 instead of in solution 1 from Example 2.
Information regarding the coverage of the corners and edges of the electrode bodies can be found in Table 1.

Comparative Example 8

Production of Capacitors Without Using the Inventive Crosslinker e)

10 capacitors were produced as in Example 3, except that the capacitor bodies were impregnated in solution 26 from Example 2 instead of in solution 1 from Example 2.
Information regarding the coverage of the corners and edges of the electrode bodies can be found in Table 1.

Comparative Example 9

Noninventive Production of Capacitors 9.1. Production of Oxidized Electrode Bodies:
Tantalum powder with a specific capacitance of 18 000 $\mu$FV/g was pressed to pellets with incorporation of a tantalum wire and sintered in order to form an electrode body with the dimensions of 1.5 mm×2.9 mm×4.0 mm. 10 of these porous electrode bodies were anodized to 100 V in a phosphoric acid electrolyte to form a dielectric.
9.2 Production of the Solid Electrolyte
100 g of dispersion B from Example 1 and 4 g of dimethyl sulfoxide (DMSO) were mixed vigorously in a beaker with a stirrer to give a dispersion B1.
The oxidized electrode bodies were impregnated in this dispersion B1 for 1 min. This was followed by drying at 120° C. for 10 min. Impregnation and drying were carried out nine further times.

9.3 Production of a Polymeric Outer Layer

A beaker with a stirrer was initially charged with 100 ml of dispersion C), and 10 ml of solution 5 from Example 2 were added while stirring and the mixture was stirred for 5 min.

The capacitor bodies were impregnated in this dispersion and then dried at 120° C. for 10 min.

The corner and edge coverage of the capacitor bodies with the polymeric outer layer was assessed by visual assessment with the aid of a light microscope. Information regarding the coverage of the corners and edges of the electrode bodies can be found in Table 1.

Comparative Example 10

Noninventive Production of Capacitors 10.1. Production of Oxidized Electrode Bodies:

Tantalum powder with a specific capacitance of 18 000 μFV/g was pressed to pellets with incorporation of a tantalum wire and sintered in order to form an electrode body with the dimensions of 1.5 mm×2.9 mm×4.0 mm. 10 of these porous electrode bodies were anodized to 100 V in a phosphoric acid electrolyte to form a dielectric.

10.2 Production of the Solid Electrolyte 100 g of dispersion B from Example 1 and 4 g of dimethyl sulfoxide (DMSO) were mixed vigorously in a beaker with a stirrer to give a dispersion B1.

The oxidized electrode bodies were impregnated in this dispersion B1 for 1 min. This was followed by drying at 120° C. for 10 min. Impregnation and drying were carried out nine further times.

10.3 Production of a Polymeric Outer Layer

A beaker with a stirrer was initially charged with 100 ml of dispersion C), and 10 ml of solution 15 from Example 2 were added while stirring and the mixture was stirred for 5 min.

The capacitor bodies were impregnated in this dispersion and then dried at 120° C. for 10 min.

The corner and edge coverage of the capacitor bodies with the polymeric outer layer was assessed by visual assessment with the aid of a light microscope. Information regarding the coverage of the corners and edges of the electrode bodies can be found in Table 1.

TABLE 1

| | Corner and edge coverage | Residual current [μA] |
|---|---|---|
| Example 3 | complete | 0.1 |
| Example 4 | complete | not measured |
| Example 5 | complete | not measured |
| Example 6 | complete | not measured |
| Example 7 | complete | not measured |
| Example 8 | complete | not measured |
| Comparative Example 1 | incomplete | 322.4 |
| Comparative Example 2 | incomplete | not measured |
| Comparative Example 3 | incomplete | not measured |
| Comparative Example 4 | incomplete | not measured |
| Comparative Example 5 | incomplete | not measured |
| Comparative Example 6 | incomplete | not measured |
| Comparative Example 7 | incomplete | not measured |
| Comparative Example 8 | incomplete | not measured |
| Comparative Example 9 | incomplete | not measured |
| Comparative Example 10 | incomplete | not measured |

The capacitors from Examples 3 to 8 have—in contrast to Comparative Examples 1 to 10—complete coverage of the electrode bodies including all corners and edges of the electrode bodies. The use of an inventive crosslinker e) enables the complete coverage of the electrode bodies.

The capacitors from Example 3 have a significantly lower residual current than the capacitors of Comparative Example 1. The use of an inventive crosslinker e) lowers the residual current significantly.

The noninventive production of a polymeric outer layer, described in Comparative Examples 9 and 10, by impregnating the electrode bodies in a mixture of crosslinker e) and dispersion C) leads to incomplete coverage of the electrode bodies with the polymeric outer layer. The introduction of crosslinker e) into dispersion C) increased the viscosity of the dispersion C) significantly.

Example 9

Production of Capacitors by the Process According to the Invention 9.1. Production of Oxidized Electrode Bodies:

Tantalum powder with a specific capacitance of 18 000 μFV/g was pressed to pellets with incorporation of a tantalum wire and sintered in order to form an electrode body with the dimensions of 1.5 mm×2.9 mm×4.0 mm. 10 of these porous electrode bodies were anodized to 100 V in a phosphoric acid electrolyte to form a dielectric.

9.2 Production of the Solid Electrolyte 100 g of dispersion B from Example 1 and 4 g of dimethyl sulfoxide (DMSO) were mixed vigorously in a beaker with a stirrer to give a dispersion B1.

The oxidized electrode bodies were impregnated in this dispersion B1 for 1 min. This was followed by drying at 120° C. for 10 min. Impregnation and drying were carried out nine further times.

9.3 Production of a Polymeric Outer Layer Using the Inventive Crosslinker e)

The capacitor bodies were impregnated in solution 4 from Example 2 and then dried at 120° C. for 10 min.

The capacitor bodies were impregnated in dispersion C from Example 1 and then dried at 120° C. for 10 min.

The capacitor bodies were impregnated again in solution 4 from Example 2 and then dried at 120° C. for 10 min.

The capacitor bodies were impregnated again in dispersion C from Example 1 and then dried at 120° C. for 10 min.

The corner and edge coverage of the capacitor bodies with the polymeric outer layer was assessed by visual assessment with the aid of a light microscope. Information regarding the coverage of the corners and edges of the electrode bodies can be found in Table 2.

Example 10

Production of Capacitors by the Process According to the Invention 10 capacitors were produced as in Example 9, except that the capacitor bodies were impregnated in solution 6 from Example 2 instead of in solution 4 from Example 2.

Information regarding the coverage of the corners and edges of the electrode bodies can be found in Table 2.

Example 11

Production of Capacitors by the Process According to the Invention 10 capacitors were produced as in Example 9, except that the capacitor bodies were impregnated in solution 7 from Example 2 instead of in solution 4 from Example 2.

Information regarding the coverage of the corners and edges of the electrode bodies can be found in Table 2.

Example 12

Production of Capacitors by the Process According to the Invention 10 capacitors were produced as in Example 9, except that the capacitor bodies were impregnated in solution 8 from Example 2 instead of in solution 4 from Example 2.

Information regarding the coverage of the corners and edges of the electrode bodies can be found in Table 2.

Example 13

Production of Capacitors by the Process According to the Invention 10 capacitors were produced as in Example 9, except that the capacitor bodies were impregnated in solution 9 from Example 2 instead of in solution 4 from Example 2.

Information regarding the coverage of the corners and edges of the electrode bodies can be found in Table 2.

Example 14

Production of Capacitors by the Process According to the Invention 10 capacitors were produced as in Example 9, except that the capacitor bodies were impregnated in solution 10 from Example 2 instead of in solution 4 from Example 2.

Information regarding the coverage of the corners and edges of the electrode bodies can be found in Table 2.

Example 15

Production of Capacitors by the Process According to the Invention 10 capacitors were produced as in Example 9, except that the capacitor bodies were impregnated in solution 11 from Example 2 instead of in solution 4 from Example 2.

Information regarding the coverage of the corners and edges of the electrode bodies can be found in Table 2.

Comparative Example 11

Production of Capacitors Without Use of the Inventive Crosslinker e)

10 capacitors were produced as in Example 9, except without using the inventive crosslinker e), i.e. without impregnating the capacitor bodies in solution 4 from Example 2.

Information regarding the coverage of the corners and edges of the electrode bodies can be found in Table 2.

TABLE 2

|  | Corner and edge coverage |
|---|---|
| Example 9 | complete |
| Example 10 | complete |
| Example 11 | complete |
| Example 12 | complete |
| Example 13 | complete |
| Example 14 | complete |
| Example 15 | complete |
| Comparative Example 11 | incomplete |

The capacitors from Examples 9 to 15 have—in contrast to Comparative Example 11—complete coverage of the electrode body, including all corners and edges of the electrode bodies. The use of an inventive crosslinker e) enables the complete coverage of the electrode bodies.

Example 16

Production of Capacitors by the Process According to the Invention 16.1 Production of Oxidized Electrode Bodies:

Tantalum powder with a specific capacitance of 18 000 µFV/g was pressed to pellets with incorporation of a tantalum wire and sintered in order to form an electrode body with the dimensions of 1.5 mm×2.9 mm×4.0 mm. 10 of these porous electrode bodies were anodized to 100 V in a phosphoric acid electrolyte to form a dielectric.

16.2 Production of the Solid Electrolyte 100 g of dispersion B from Example 1 and 4 g of dimethyl sulfoxide (DMSO) were mixed vigorously in a beaker with a stirrer to give a dispersion B1.

The oxidized electrode bodies were impregnated in this dispersion B1 for 1 min. This was followed by drying at 120° C. for 10 min. Impregnation and drying were carried out nine further times.

16.3 Production of a Polymeric Outer Layer Using the Inventive Crosslinker e)

The capacitor bodies were impregnated in solution 13 from Example 2 and then dried at 120° C. for 10 min.

The capacitor bodies were impregnated in dispersion C from Example 1 and then dried at 120° C. for 10 min.

The corner and edge coverage of the capacitor bodies with the polymeric outer layer was assessed by visual assessment with the aid of a light microscope. Information regarding the coverage of the corners and edges of the electrode bodies can be found in Table 3.

Finally, the electrode bodies were coated with a graphite layer and a silver layer.

The mean electrical values of the 10 capacitors produced in the above manner can be found in Table 3. The capacitance (in microfarads) was determined at 120 Hz and the equivalent series resistance (ESR) (in milliohms) at 100 kHz by means of an LCR meter (Agilent 4284A).

Example 17

Production of Capacitors by the Process According to the Invention 17.1 Production of Oxidized Electrode Bodies:

Tantalum powder with a specific capacitance of 18 000 µFV/g was pressed to pellets with incorporation of a tantalum wire and sintered in order to form an electrode body with the dimensions of 1.5 mm×2.9 mm×4.0 mm. 10 of these porous electrode bodies were anodized to 100 V in a phosphoric acid electrolyte to form a dielectric.

17.2 Production of the Solid Electrolyte 100 g of dispersion B from Example 1 and 4 g of dimethyl sulfoxide (DMSO) were mixed vigorously in a beaker with a stirrer to give a dispersion B1.

The oxidized electrode bodies were impregnated in this dispersion B1 for 1 min. This was followed by drying at 120° C. for 10 min. Impregnation and drying were carried out nine further times.

17.3 Production of a Polymeric Outer Layer Using the Inventive Crosslinker e)

The capacitor bodies were impregnated in solution 13 from Example 2 and then dried at 120° C. for 10 min.

The capacitor bodies were impregnated in dispersion C from Example 1 and then dried at 120° C. for 10 min.

The capacitor bodies were impregnated again in solution 13 from Example 2 and then dried at 120° C. for 10 min.

The capacitor bodies were impregnated again in dispersion C from Example 1 and then dried at 120° C. for 10 min.

The corner and edge coverage of the capacitor bodies with the polymeric outer layer was assessed by visual assessment with the aid of a light microscope. Information regarding the coverage of the corners and edges of the electrode bodies can be found in Table 3.

Finally, the electrode bodies were coated with a graphite layer and a silver layer.

The mean electrical values of the 10 capacitors produced in the above manner can be found in Table 3. The capacitance (in microfarads) was determined at 120 Hz and the equivalent series resistance (ESR) (in milliohms) at 100 kHz by means of an LCR meter (Agilent 4284A).

Example 18

Production of Capacitors by the Process According to the Invention 18.1 Production of Oxidized Electrode Bodies:

Tantalum powder with a specific capacitance of 18 000 µFV/g was pressed to pellets with incorporation of a tantalum wire and sintered in order to form an electrode body with the dimensions of 1.5 mm×2.9 mm×4.0 mm. 10 of these porous electrode bodies were anodized to 100 V in a phosphoric acid electrolyte to form a dielectric.

18.2 Production of the Solid Electrolyte 100 g of dispersion B from Example 1 and 4 g of dimethyl sulfoxide (DMSO) were mixed vigorously in a beaker with a stirrer to give a dispersion B1.

The oxidized electrode bodies were impregnated in this dispersion B1 for 1 min. This was followed by drying at 120° C. for 10 min. Impregnation and drying were carried out nine further times.

18.3 Production of a Polymeric Outer Layer Using the Inventive Crosslinker e)

The capacitor bodies were impregnated in solution 13 from Example 2 and then dried at 120° C. for 10 min.

The capacitor bodies were impregnated in dispersion C from Example 1 and then dried at 120° C. for 10 min.

The capacitor bodies were impregnated again in solution 13 from Example 2 and then dried at 120° C. for 10 min.

The capacitor bodies were impregnated again in dispersion C from Example 1 and then dried at 120° C. for 10 min.

The capacitor bodies were impregnated again in solution 13 from Example 2 and then dried at 120° C. for 10 min.

The capacitor bodies were impregnated again in dispersion C from Example 1 and then dried at 120° C. for 10 min.

The corner and edge coverage of the capacitor bodies with the polymeric outer layer was assessed by visual assessment with the aid of a light microscope.

Information regarding the coverage of the corners and edges of the electrode bodies can be found in Table 3.

Finally, the electrode bodies were coated with a graphite layer and a silver layer.

The mean electrical values of the 10 capacitors produced in the above manner can be found in Table 3. The capacitance (in microfarads) was determined at 120 Hz and the equivalent series resistance (ESR) (in milliohms) at 100 kHz by means of an LCR meter (Agilent 4284A).

Example 19

Production of Capacitors by the Process According to the Invention 10 capacitors were produced as in Example 16, except that the capacitor bodies were impregnated in solution 5 from Example 2 instead of in solution 13 from Example 2.

The mean electrical values of the 10 capacitors produced in the above manner can be found in Table 3, as can information regarding the coverage of the corners and edges of the electrode bodies.

Example 20

Production of Capacitors by the Process According to the Invention 10 capacitors were produced as in Example 17, except that the capacitor bodies were impregnated in solution 5 from Example 2 instead of in solution 13 from Example 2.

The mean electrical values of the 10 capacitors produced in the above manner can be found in Table 3, as can information regarding the coverage of the corners and edges of the electrode bodies.

Example 21

Production of Capacitors by the Process According to the Invention 10 capacitors were produced as in Example 18, except that the capacitor bodies were impregnated in solution 5 from Example 2 instead of in solution 13 from Example 2.

The mean electrical values of the 10 capacitors produced in the above manner can be found in Table 3, as can information regarding the coverage of the corners and edges of the electrode bodies.

Example 22

Production of Capacitors by the Process According to the Invention 10 capacitors were produced as in Example 16, except that the capacitor bodies were impregnated in solution 14 from Example 2 instead of in solution 13 from Example 2.

The mean electrical values of the 10 capacitors produced in the above manner can be found in Table 3, as can information regarding the coverage of the corners and edges of the electrode bodies.

Example 23

Production of Capacitors by the Process According to the Invention 10 capacitors were produced as in Example 17, except that the capacitor bodies were impregnated in solution 14 from Example 2 instead of in solution 13 from Example 2.

The mean electrical values of the 10 capacitors produced in the above manner can be found in Table 3, as can information regarding the coverage of the corners and edges of the electrode bodies.

Example 24

Production of Capacitors by the Process According to the Invention 10 capacitors were produced as in Example 18, except that the capacitor bodies were impregnated in solution 14 from Example 2 instead of in solution 13 from Example 2.

The mean electrical values of the 10 capacitors produced in the above manner can be found in Table 3, as can information regarding the coverage of the corners and edges of the electrode bodies.

Example 25

Production of Capacitors by the Process According to the Invention 10 capacitors were produced as in Example 16, except that the capacitor bodies were impregnated in solution 15 from Example 2 instead of in solution 13 from Example 2.

The mean electrical values of the 10 capacitors produced in the above manner can be found in Table 3, as can information regarding the coverage of the corners and edges of the electrode bodies.

Example 26

Production of Capacitors by the Process According to the Invention 10 capacitors were produced as in Example 17, except that the capacitor bodies were impregnated in solution 15 from Example 2 instead of in solution 13 from Example 2.

The mean electrical values of the 10 capacitors produced in the above manner can be found in Table 3, as can information regarding the coverage of the corners and edges of the electrode bodies.

Example 27

Production of Capacitors by the Process According to the Invention 10 capacitors were produced as in Example 18, except that the capacitor bodies were impregnated in solution 15 from Example 2 instead of in solution 13 from Example 2.

The mean electrical values of the 10 capacitors produced in the above manner can be found in Table 3, as can information regarding the coverage of the corners and edges of the electrode bodies.

Comparative Example 12

Production of Capacitors Without Using the Inventive Crosslinker e)

10 capacitors were produced as in Example 16, except without using the inventive crosslinker e), i.e. without impregnating the capacitor bodies in solution 13 from Example 2.

The mean electrical values of the 10 capacitors produced in the above manner can be found in Table 3, as can information regarding the coverage of the corners and edges of the electrode bodies.

Comparative Example 13

Production of Capacitors Without Using the Inventive Crosslinker e)

10 capacitors were produced as in Example 17, except without using the inventive crosslinker e), i.e. without impregnating the capacitor bodies in solution 13 from Example 2.

The mean electrical values of the 10 capacitors produced in the above manner can be found in Table 3, as can information regarding the coverage of the corners and edges of the electrode bodies.

Comparative Example 14

Production of Capacitors Without Using the Inventive Crosslinker e)

10 capacitors were produced as in Example 18, except without using the inventive crosslinker e), i.e. without impregnating the capacitor bodies in solution 13 from Example 2.

The mean electrical values of the 10 capacitors produced in the above manner can be found in Table 3, as can information regarding the coverage of the corners and edges of the electrode bodies.

TABLE 3

|  | Capacitance [µF] | ESR [mΩ] | Edge and corner coverage |
|---|---|---|---|
| Example 16 | 14.4 | 70.9 | complete |
| Example 17 | 14.3 | 74.4 | complete |
| Example 18 | 14.1 | 67.4 | complete |
| Example 19 | 15.0 | 117.5 | complete |
| Example 20 | 14.9 | 134.4 | complete |
| Example 21 | 15.0 | 116.3 | complete |
| Example 22 | 14.9 | 73.2 | complete |
| Example 23 | 14.9 | 68.9 | complete |
| Example 24 | 15.1 | 67.1 | complete |
| Example 25 | 14.7 | 43.2 | complete |
| Example 26 | 14.8 | 43.9 | complete |
| Example 27 | 14.7 | 43.2 | complete |
| Comparative Example 12 | 14.5 | 92.4 | incomplete |
| Comparative Example 13 | 14.4 | 85.3 | incomplete |
| Comparative Example 14 | 14.4 | 85.4 | incomplete |

The capacitors from Examples 16 to 27 have complete coverage of the electrode bodies with comparable capacitance, in contrast to the electrode bodies of Comparative Examples 12 to 14.

The suitable selection of the inventive crosslinker e) and of the solvent system for preparation of the inventive crosslinker e) enables a significant reduction in the ESR in solid electrolytic capacitors with comparable capacitance while obtaining complete coverage of the electrode body.

The multiple impregnation in the dispersion C) from Example 1 without the use of an inventive crosslinker e) also does not lead to complete coverage of the electrode body of the solid electrolytic capacitors being obtained. This was shown by Comparative Examples 12 to 14.

Example 28

Production of Capacitors by the Process According to the Invention 10 capacitors were produced as in Example 16, except that the capacitor bodies were impregnated in solution 16 from Example 2 instead of in solution 13 from Example 2.

The mean electrical values of the 10 capacitors produced in the above manner can be found in Table 4, as can information regarding the coverage of the corners and edges of the electrode bodies.

Example 29

Production of Capacitors by the Process According to the Invention 10 capacitors were produced as in Example 16, except that the capacitor bodies were impregnated in solution 17 from Example 2 instead of in solution 13 from Example 2.

The mean electrical values of the 10 capacitors produced in the above manner can be found in Table 4, as can information regarding the coverage of the corners and edges of the electrode bodies.

Example 30

Production of Capacitors by the Process According to the Invention 10 capacitors were produced as in Example 16, except that the capacitor bodies were impregnated in solution 18 from Example 2 instead of in solution 13 from Example 2.

The mean electrical values of the 10 capacitors produced in the above manner can be found in Table 4, as can information regarding the coverage of the corners and edges of the electrode bodies.

Example 31

Production of Capacitors by the Process According to the Invention 10 capacitors were produced as in Example 16, except that the capacitor bodies were impregnated in solution 19 from Example 2 instead of in solution 13 from Example 2.

The mean electrical values of the 10 capacitors produced in the above manner can be found in Table 4, as can information regarding the coverage of the corners and edges of the electrode bodies.

TABLE 4

|  | Capacitance [μF] | ESR [mΩ] | Edge and corner coverage |
| --- | --- | --- | --- |
| Example 28 | 14.7 | 51.2 | complete |
| Example 29 | 14.4 | 194.1 | complete |
| Example 30 | 14.5 | 80.1 | complete |
| Example 31 | 14.3 | 140.4 | complete |

The capacitors from Examples 28 and 30 have a significantly lower ESR than the capacitors of Examples 29 and 31. The pH of the crosslinkers e) prepared in accordance with the invention was 5 in Example 28 and 7 in Example 30, whereas the pH was 11 in Examples 29 and 31.

The crosslinker e) prepared in accordance with the invention with a pH within the preferred range leads to a significant lowering of the ESR in solid electrolytic capacitors. This is done while obtaining complete coverage of the electrode body of the solid electrolytic capacitors.

Example 32

A beaker with a stirrer was initially charged with 100 ml of dispersion C), and 10 ml of demineralized water were added while stirring and the mixture was stirred for 60 min. Subsequently, the viscosity was measured with a rheometer at 20° C. and a shear rate of 100 s$^{-1}$. The value of the viscosity measured can be found in Table 5.

Example 33

A beaker with a stirrer was initially charged with 100 ml of dispersion C), and 10 ml of solution 5 from Example 2 were added while stirring and the mixture was stirred for 60 min. Subsequently, the viscosity was measured with a rheometer at 20° C. and a shear rate of 100 s$^{-1}$. The value of the viscosity measured can be found in Table 5.

Example 34

A beaker with a stirrer was initially charged with 100 ml of dispersion C), and 10 ml of solution 5 from Example 2 and then 1 g of the cation exchanger Lewatit S100 from Lanxess AG (Leverkusen) were added while stirring and the mixture was stirred for 60 min. The cation exchanger was removed by means of a 5 μm sieve, and the viscosity was measured with a rheometer at 20° C. and a shear rate of 100 s$^{-1}$. The value of the viscosity measured can be found in Table 5.

TABLE 5

|  | Viscosity [mPas] |
| --- | --- |
| Example 32 | 149 |
| Example 33 | 218 |
| Example 34 | 152 |

Compared to Example 32, the addition of the crosslinker e) prepared in accordance with the invention to the dispersion C)—as done in Example 33—leads to a significant rise in the viscosity of the dispersion.

Compared to Example 32, the addition of the crosslinker e) prepared in accordance with the invention to the dispersion C) and the subsequent addition of the cation exchanger—as done in Example 34—leads to a stabilization of the viscosity of the dispersion.

By means of the treatment with ion exchangers, it is possible to remove cations which originate from the crosslinker e) from the dispersion C) in order to prevent crosslinking reactions in the bath.

Example 35

Production of Capacitors by the Process According to the Invention 35.1 Production of Oxidized Electrode Bodies:
Tantalum powder with a specific capacitance of 18 000 µFV/g was pressed to pellets with incorporation of a tantalum wire and sintered in order to form an electrode body with the dimensions of 1.5 mm×2.9 mm×4.0 mm. 10 of these porous electrode bodies were anodized to 100 V in a phosphoric acid electrolyte to form a dielectric.

35.2 Production of the Solid Electrolyte
100 g of dispersion B from Example 1 and 4 g of dimethyl sulfoxide (DMSO) were mixed vigorously in a beaker with a stirrer to give a dispersion B1.

The oxidized electrode bodies were impregnated in this dispersion B1 for 1 min. This was followed by drying at 120° C. for 10 min. Impregnation and drying were carried out nine further times.

35.3 Production of a Polymeric Outer Layer Using the Inventive Crosslinker e)
The capacitor bodies were impregnated in solution 15 from Example 2 and then dried at 120° C. for 10 min.

The capacitor bodies were impregnated in dispersion C from Example 1 and then dried at 120° C. for 10 min.

The capacitor bodies were impregnated again in solution 15 from Example 2 and then dried at 120° C. for 10 min.

The capacitor bodies were impregnated again in dispersion C from Example 1 and then dried at 120° C. for 10 min.

The capacitor bodies were impregnated again in solution 15 from Example 2 and then dried at 120° C. for 10 min.

The capacitor bodies were impregnated again in dispersion C from Example 1 and then dried at 120° C. for 10 min.

The capacitor bodies were impregnated again in solution 15 from Example 2 and then dried at 120° C. for 10 min.

The capacitor bodies were impregnated again in dispersion C from Example 1 and then dried at 120° C. for 10 min.

Finally, the electrode bodies were coated with a graphite layer and a silver layer.

The equivalent series resistance (ESR) (in milliohms) was determined at 100 kHz by means of an LCR meter (Agilent 4284A) (0 days). Subsequently, the capacitors were stored at 125° C. in a drying cabinet for 7 days, and the ESR was determined after 1, 2, 3, 4, 6 and 7 days of storage. A mean value for the ESR of each of the 10 capacitors produced and stored in the above manner can be found in FIG. 3.

Comparative Example 15

Production of Capacitors Without Using the Inventive Crosslinker e)

10 capacitors were produced as in Example 35, except without using the inventive crosslinker e), i.e. without impregnating the capacitor bodies in solution 15 from Example 2.

The equivalent series resistance (ESR) (in milliohms) was determined at 100 kHz by means of an LCR meter (Agilent 4284A) (0 days). Subsequently, the capacitors were stored at 125° C. in a drying cabinet for 7 days, and the ESR was determined after 1, 2, 3, 4, 6 and 7 days of storage. A mean value for the ESR of each of the 10 capacitors produced and stored in the above manner can be found in FIG. 3.

Figure 3:
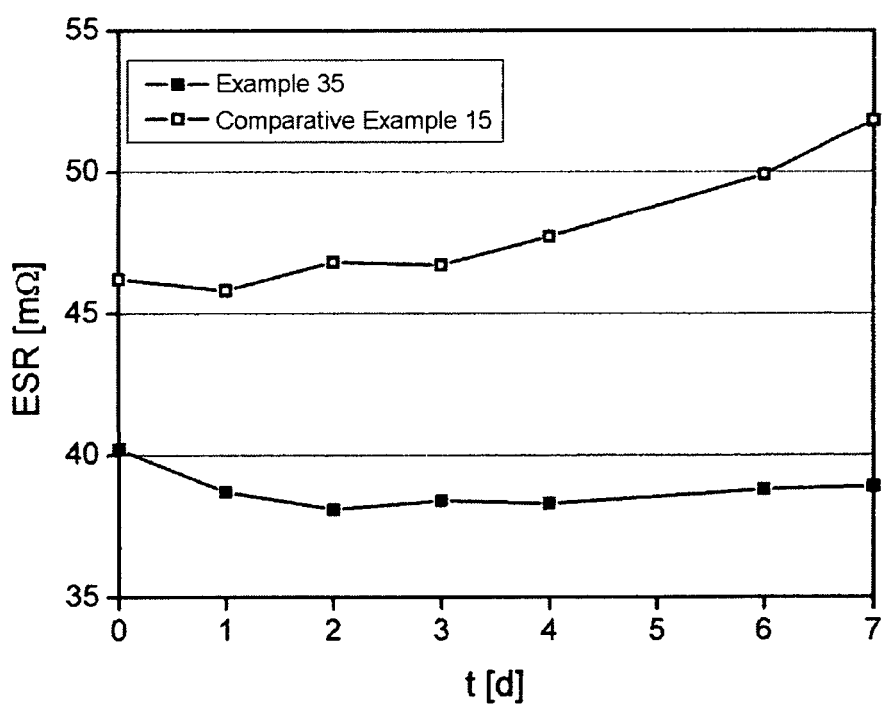
FIGS. 3 and 4 illustrates a mean value for the ESR of each of the capacitors produced and stored.

FIG. 3: mean ESR (in milliohms) of the capacitors from Example 35 and Comparative Example 15 measured before storage at 125° C. (0 d) and after each of 1, 2, 3, 4, 6 and 7 days (1-7 d) of storage at 125° C.

The capacitors from Example 35 have a significantly lower ESR than the capacitors of Comparative Example 15.

The crosslinker e) prepared in accordance with the invention leads to a significant lowering of the ESR in solid electrolytic capacitors.

The capacitors from Example 35 have, in contrast to the capacitors from Comparative Example 15, no rise in the ESR under thermal stress.

The crosslinker e) prepared in accordance with the invention leads to a significant improvement in the thermal stability in solid electrolytic capacitors.

Example 36

Production of Capacitors by the Process According to the Invention 36.1 Production of Oxidized Electrode Bodies:
Tantalum powder with a specific capacitance of 50 000 µFV/g was pressed to pellets 2 with incorporation of a tantalum wire 7, and sintered in order to form a porous electrode body with the dimensions 4.2 mm×3 mm×1 mm. 10 of these porous electrode bodies were anodized to 30 V in a phosphoric acid electrolyte to form a dielectric.

36.2 Production of the Solid Electrolyte
A solution consisting of one part by weight of 3,4-ethylenedioxythiophene (Clevios™ MV2, H.C. Starck GmbH) and 20 parts by weight of a 40% by weight ethanolic solution of iron(III) p-toluenesulfonate (Clevios™ C-E, H.C. Starck GmbH) was prepared.

The solution was used to impregnate the 10 anodized electrode bodies. The electrode bodies were impregnated in this solution and then dried at room temperature (20° C.) for 30 min. Thereafter, they were heat treated at 50° C. in a drying cabinet for 30 min. Subsequently, the electrode bodies were washed in a 2% by weight aqueous solution of p-toluenesulfonic acid for 30 min. The electrode bodies were reformed in a 0.25% aqueous solution of p-toluenesulfonic acid for 30 min, then rinsed in demineralized water and dried. The described impregnation, drying, thermal treatment and reforming were carried out twice more with the same electrode bodies.

36.3 Production of a Polymeric Outer Layer Using the Inventive Crosslinker e)
The capacitor bodies were impregnated in solution 15 from Example 2 and then dried at 120° C. for 10 min.

The capacitor bodies were impregnated in dispersion C from Example 1 and then dried at 120° C. for 10 min.

The capacitor bodies were impregnated again in solution 15 from Example 2 and then dried at 120° C. for 10 min.

The capacitor bodies were impregnated again in dispersion C from Example 1 and then dried at 120° C. for 10 min.

The capacitor bodies were impregnated again in solution 15 from Example 2 and then dried at 120° C. for 10 min.

The capacitor bodies were impregnated again in dispersion C from Example 1 and then dried at 120° C. for 10 min.

Finally, the electrode bodies were coated with a graphite layer and a silver layer.

The equivalent series resistance (ESR) (in milliohms) was determined at 100 kHz by means of an LCR meter (Agilent 4284A) (0 days). Subsequently, the capacitors were stored at 125° C. in a drying cabinet for 7 days, and the ESR was determined after 1, 2, 3, 4, 6 and 7 days of storage. A mean value for the ESR of each of the 10 capacitors produced and stored in the above manner can be found in FIG. 4.

Comparative Example 16

Production of Capacitors Without Using the Inventive Crosslinker e)

10 capacitors were produced as in Example 36, except without using the inventive crosslinker e), i.e. without impregnating the capacitor bodies in solution 15 from Example 2.

The equivalent series resistance (ESR) (in milliohms) was determined at 100 kHz by means of an LCR meter (Agilent 4284A) (0 days). Subsequently, the capacitors were stored at 125° C. in a drying cabinet for 7 days, and the ESR was determined after 1, 2, 3, 4, 6 and 7 days of storage. A mean value for the ESR of each of the 10 capacitors produced and stored in the above manner can be found in FIG. 4.

Figure 4:
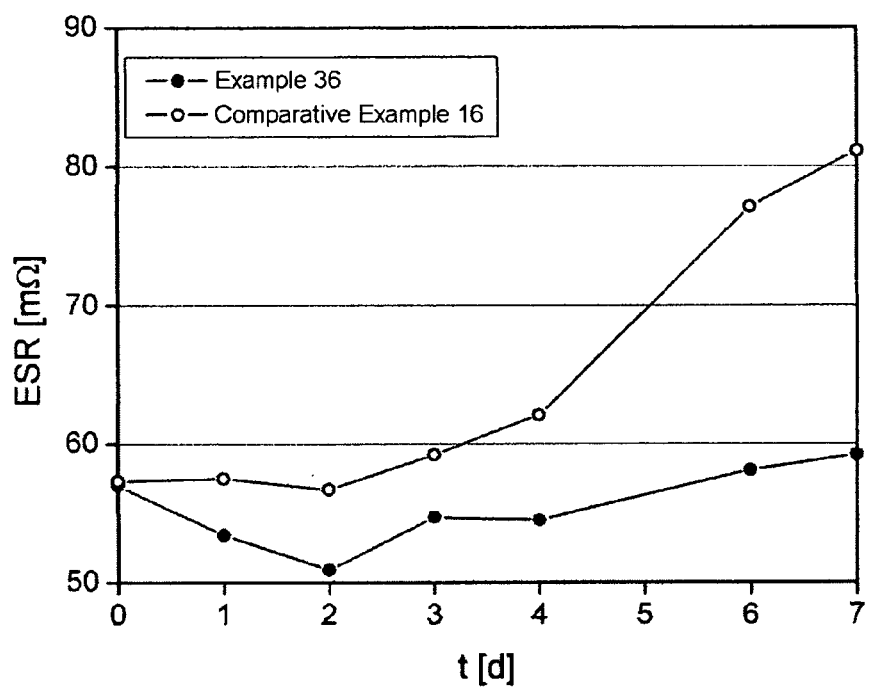

FIG. 4: mean ESR (in milliohms) of the capacitors from Example 36 and Comparative Example 16 measured before storage at 125° C. (0 d) and after each of 1, 2, 3, 4, 6 and 7 days (1-7 d) of storage at 125° C.

The capacitors from Example 36 have, in contrast to the capacitors from Comparative Example 16, no significant rise in the ESR under lasting thermal stress.

The crosslinker e) prepared in accordance with the invention leads to a significant improvement in the thermal stability in solid electrolytic capacitors.

Example 37

Production of Capacitors by the Process According to the Invention 37.1 Production of Oxidized Electrode Bodies:

Tantalum powder with a specific capacitance of 18 000 µFV/g was pressed to pellets with incorporation of a tantalum wire and sintered in order to form an electrode body with the dimensions of 1.5 mm×2.9 mm×4.0 mm. 10 of these porous electrode bodies were anodized to 100 V in a phosphoric acid electrolyte to form a dielectric.

37.2 Production of the Solid Electrolyte 100 g of dispersion B from Example 1 and 4 g of dimethyl sulfoxide (DMSO) were mixed vigorously in a beaker with a stirrer to give a dispersion B1.

The oxidized electrode bodies were impregnated in this dispersion B1 for 1 min. This was followed by drying at 120° C. for 10 min. Impregnation and drying were carried out nine further times.

37.3 Production of a Polymeric Outer Layer Using the Inventive Crosslinker e)

The capacitor bodies were impregnated in solution 15 from Example 2 and then dried at 120° C. for 10 min.

The capacitor bodies were impregnated in dispersion C from Example 1 and then dried at 120° C. for 10 min.

Figure 5:
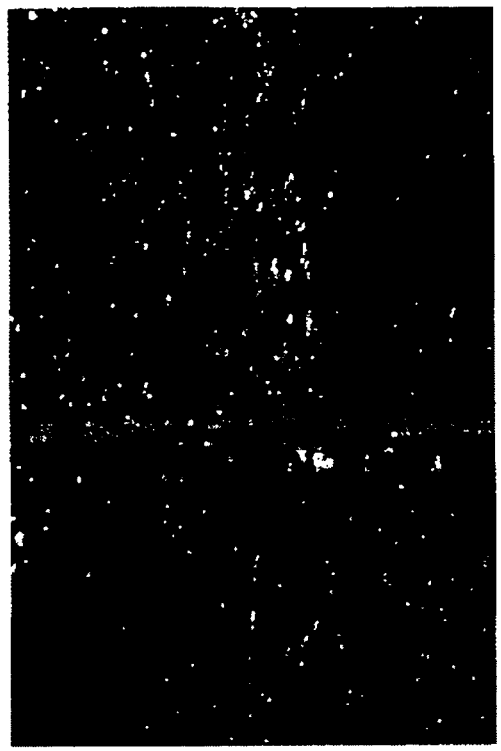
FIG. 5 shows, by way of example, a section of a scratch in the polymeric outer layer of a capacitor from Example 37.

The polymeric outer layer on one of the side faces of the electrode bodies was scored by means of a scalpel. The damage to the polymeric outer layer (scratch) which arose from the scoring was assessed by visual assessment with the aid of a light microscope. The type and form of the scratch and any flaking of the polymeric outer layer which occurs can be used to draw conclusions about the brittleness of the polymeric outer layer. FIG. 5 shows, by way of example, a section of a scratch on a capacitor body. No flaking of the polymeric outer layer of the capacitor bodies was found at the scratch. The polymeric outer layer was not brittle.

FIG. 5: Section of a scratch in the polymeric outer layer of a capacitor from Example 37.

Comparative Example 17

Noninventive Production of Capacitors 17.1 Production of Oxidized Electrode Bodies:

Tantalum powder with a specific capacitance of 18 000 µFV/g was pressed to pellets with incorporation of a tantalum wire and sintered in order to form an electrode body with the dimensions of 1.5 mm×2.9 mm×4.0 mm. 10 of these porous electrode bodies were anodized to 100 V in a phosphoric acid electrolyte to form a dielectric.

17.2 Production of the Solid Electrolyte 100 g of dispersion B from Example 1 and 4 g of dimethyl sulfoxide (DMSO) were mixed vigorously in a beaker with a stirrer to give a dispersion B1.

The oxidized electrode bodies were impregnated in this dispersion B1 for 1 min. This was followed by drying at 120° C. for 10 min. Impregnation and drying were carried out nine further times.

17.3 Production of a Polymeric Outer Layer

The capacitor bodies were impregnated in dispersion D from Example 1 and then dried at 120° C. for 10 min.

Figure 6:
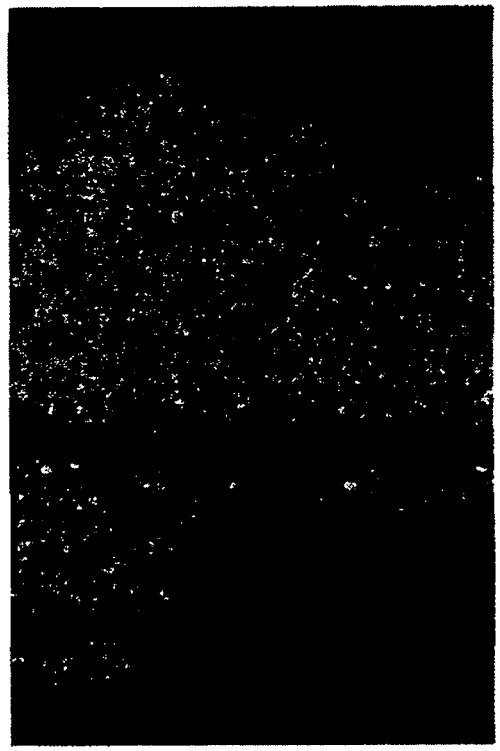
FIG. 6 shows, by way of example, a section of a scratch in the polymeric outer layer of a capacitor body from Comparative Example 17.

The polymeric outer layer on one of the side faces of the electrode bodies was scored by means of a scalpel. The damage to the polymeric outer layer (scratch) which arose from the scoring was assessed by visual assessment with the aid of a light microscope. The type and form of the scratch and any flaking of the polymeric outer layer which occurs can be used to draw conclusions about the brittleness of the polymeric outer layer. FIG. 6 shows, by way of example, a section of a scratch on a capacitor body. Large-area flaking of the polymeric outer layer of the capacitor bodies at the scratch was found. The polymeric outer layer was brittle.

FIG. 6: Section of a scratch in the polymeric outer layer of a capacitor body from Comparative Example 17.

In Example 37, there is no flaking of the polymeric outer layer at the scratch. In Comparative Example 17, in contrast, large-area flaking of the polymeric outer layer is observed. The use of an inventive crosslinker e) achieves complete coverage of the electrode bodies with a polymeric outer layer without use of dispersions comprising solid particles having a diameter in the range from 0.7 to 20 µm. The polymeric outer layers thus produced are not brittle and therefore do not flake off under mechanical stress.

Example 38

Examination of the Solubility of the Inventive Crosslinker e)

5 ml of solution 2 from Example 2 were added to a beaker which was placed into a fan-extracted drying cabinet at 120° C. until the solution was concentrated to dryness, but at least for 120 min. 5 ml of dispersion C) from Example 1 were added to the residue z) thus obtained while stirring by means of a stirrer, thus attempting to dissolve the latter therein.

There was a visual assessment for residues of residue z) in dispersion C) from Example 1: the residue z) was taken up without residue in 5 ml of dispersion C) from Example 1 and was thus designated as "soluble".

When this crosslinker e) which is soluble in the dispersion C) from Example 1 is used, as shown in Example 4, complete coverage of the electrode bodies is obtained in the process according to the invention.

The results of the assessment of solubility and information regarding the coverage of the corners and edges of the electrode bodies are listed in Table 6.

Example 39

Examination of the Solubility of the Inventive Crosslinker e)

An examination of solubility was performed as in Example 38, except that the crosslinker used was solution 18 from Example 2 instead of solution 2 from Example 2.

The residue of solution 18 was taken up without residue in 5 ml of dispersion C) from Example 1 and was thus designated as "soluble".

When this crosslinker e) soluble in dispersion C) from Example 1 is used, as shown in Example 30, complete coverage of the electrode bodies is obtained in the process according to the invention.

The results of the assessment of solubility and information regarding the coverage of the corners and edges of the electrode bodies are listed in Table 6.

Example 40

Examination the Solubility of the Inventive Crosslinker e)

An examination of solubility was performed as in Example 38, except that the crosslinker used was solution 14 from Example 2 instead of solution 2 from Example 2.

The residue of solution 14 was taken up without residue in 5 ml of dispersion C) from Example 1 and was thus designated as "soluble".

When this crosslinker e) soluble in dispersion C) from Example 1 is used, as shown in Example 22, complete coverage of the electrode bodies is obtained in the process according to the invention.

The results of the assessment of solubility and information regarding the coverage of the corners and edges of the electrode bodies are listed in Table 6.

Example 41

Examination of the Solubility of the Inventive Crosslinker e)

An examination of solubility was performed as in Example 38, except that the crosslinker used was solution 15 from Example 2 instead of solution 2 from Example 2.

The residue of solution 15 was taken up without residue in 5 ml of dispersion C) from Example 1 and was thus designated as "soluble".

When this crosslinker e) soluble in dispersion C) from Example 1 is used, as shown in Example 25, complete coverage of the electrode bodies is obtained in the process according to the invention.

The results of the assessment of solubility and information regarding the coverage of the corners and edges of the electrode bodies are listed in Table 6.

Comparative Example 18

Examination of the Solubility of a Noninventive Crosslinker e)

An examination of solubility was performed as in Example 38, except that the crosslinker used was solution 27 from Example 2 instead of solution 2 from Example 2.

The residue of solution 27 was not taken up without residue in 5 ml of dispersion C) from Example 1 and was thus designated as "insoluble".

10 capacitors were produced as in Example 3, except that the capacitor bodies were impregnated in solution 27 from Example 2 instead of in solution 1 from Example 2.

The results of the assessment of solubility and information regarding the coverage of the corners and edges of the electrode bodies are listed in Table 6.

Comparative Example 19

Examination of the Solubility of a Noninventive Crosslinker e)

An examination of solubility was performed as in Example 38, except that the crosslinker used was solution 28 from Example 2 instead of solution 2 from Example 2.

The residue of solution 28 was not taken up without residue in 5 ml of dispersion C) from Example 1 and was thus designated as "insoluble".

10 capacitors were produced as in Example 3, except that the capacitor bodies were impregnated in solution 28 from Example 2 instead of in solution 1 from Example 2.

The results of the assessment of solubility and information regarding the coverage of the corners and edges of the electrode bodies are listed in Table 6.

TABLE 6

|  | Corner and edge coverage | Solubility |
| --- | --- | --- |
| Example 38 | complete | soluble |
| Example 39 | complete | soluble |
| Example 40 | complete | soluble |
| Example 41 | complete | soluble |
| Comparative Example 18 | incomplete | insoluble |
| Comparative Example 19 | incomplete | insoluble |

The crosslinkers e) used in Examples 38 to 41 were, in contrast to the crosslinkers in Comparative Examples 18 and 19, soluble in the dispersion C). The solubility of the crosslinker e) in the dispersion led to better corner and edge coverage.

The invention claimed is:

1. A process for producing an electrolytic capacitor, in which at least one crosslinker e) is applied to a capacitor body at least comprising
    an electrode body of an electrode material and a dielectric which covers the surface of this electrode material, and
    a solid electrolyte at least comprising an electrically conductive material which completely or partially covers the dielectric surface,
    and, after applying the crosslinker e), at least one solution a') of a conjugated polymer b) or a dispersion a) of a conjugated polymer b) is applied, and a polymeric outer layer is formed by at least partly removing a solvent d') or a dispersant d), the crosslinker e), after applying the solution a) or dispersion a), forms at least one polyvalent cation.

2. The process according to claim 1, wherein the solution or dispersion a) comprises at least one polymer with a mean molecular weight (weight average) greater than 1000.

3. The process according to claim 2, wherein the polymer having a mean molecular weight greater than 1000 comprises at least the conjugated polymer b) of the solution a') or dispersion a), a polymeric anion or a polymeric binder.

4. The process according to claim 3, wherein the polymeric anion is an anion of a polymeric carboxylic or sulfonic acid.

5. The process according to claim 1, wherein the crosslinker c) is applied from a solution or dispersion whose pH measured at 25° C. is less than 10.

6. The process according to claim 5, wherein the solvent or dispersant of the solution or dispersion from which the crosslinker e) is applied comprises at least water or at least one organic solvent or dispersant.

7. The process according to claim 1, wherein the crosslinker e), after being applied to the capacitor body, is in the form of a salt or of a salt solution.

8. The process according to claim 7, wherein that the salt of the crosslinker e) is soluble in solution a') or dispersion a).

9. The process according to claim 1, wherein the crosslinker and the solution a') or dispersion a) are applied sequentially and repeatedly.

10. The process according to claim 1, wherein the solution a') or dispersion a) comprises, as the conjugated polymer b), at least one polythiophene, polyaniline or polypyrrole which is optionally substituted.

11. The process according to claim 1, wherein the conductive material of the solid electrolyte is a conductive polymer.

12. The process according to claim 1, wherein the electrode material of the electrode body is a valve metal or a compound having electrical properties comparable to a valve metal.

13. The process according to claim 1, wherein the parts of the solution a') or the dispersion a) which, after application of the crosslinker e), were in contact with the capacitor body but do not remain thereon and are reused are in contact with one or more ion exchangers continuously or in phases.

14. A process for producing an electrolytic capacitor, in which at least one crosslinker e) is applied to a capacitor body at least comprising
an electrode body of an electrode material and a dielectric which covers the surface of this electrode material, and
a solid electrolyte at least comprising an electrically conductive material which completely or partially covers the dielectric surface, and,
after applying the crosslinker e), at least one solution a') of a conjugated polymer b) or a dispersion a) of a conjugated polymer b) is applied, and a polymeric outer layer is formed by at least partly removing a solvent d') or dispersant d),
wherein the crosslinker e) comprises
at least one diamine, triamine, oligoamine or polymeric amine or derivatives thereof,
at least one cation and additionally at least one amine group, or
at least one polyvalent cation.

15. The process according to claim 14 wherein the solution a') or dispersion a) comprises at least one polymer with a mean molecular weight (weight average) greater than 1000.

16. The process according to claim 15, wherein the polymer having a mean molecular weight greater than 1000 comprises at least the conjugated polymer b) of the solution a') or dispersion a), a polymeric anion or a polymeric binder.

17. The process according to claim 16, wherein the polymeric anion is an anion of a polymeric carboxylic or sulfonic acid.

18. The process according to claim 14, wherein the crosslinker e) is applied from a solution or dispersion whose pH measured at 25° C. is less than 10.

19. The process according to claim 18, wherein the solvent or dispersant of the solution or dispersion from which the crosslinker c) is applied comprises at least water or at least one organic solvent or dispersant.

20. The process according to claim 14, wherein the crosslinker e), after being applied to the capacitor body, is in the form of a salt or of a salt solution.

21. The process according to claim 20, wherein the salt of the crosslinker e) is soluble in solution a') or dispersion a).

22. The process according to claim 14, wherein the crosslinker and the solution a') or dispersion a) are applied sequentially and repeatedly.

23. The process according to claim 14, wherein the solution a') or dispersion a) comprises, as the conjugated polymer b), at least one polythiophene, polyaniline or polypyrrole which is optionally substituted.

24. The process according to claim 14, wherein the conductive material of the solid electrolyte is a conductive polymer.

25. The process according to claim 14, wherein the electrode material of the electrode body is a valve metal or a compound having electrical properties comparable to a valve metal.

26. The process according to claim 14, wherein the parts of the solution a') or the dispersion a) which, after application of the crosslinker e), were in contact with the capacitor body but do not remain thereon and are reused are in contact with one or more ion exchangers continuously or in phases.

27. The process according to claim 14, wherein the crosslinker is diamine.

* * * * *